(12) United States Patent
Akasawa et al.

(10) Patent No.: US 6,483,540 B1
(45) Date of Patent: Nov. 19, 2002

(54) IMAGE DATA PROCESSING APPARATUS METHOD AND PROGRAM STORAGE MEDIUM FOR PROCESSING IMAGE DATA

(75) Inventors: Mitsuyuki Akasawa, Tokyo (JP); Akira Miyata, Tokyo (JP); Kazuto Yamamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/094,862

(22) Filed: Jun. 15, 1998

(30) Foreign Application Priority Data

Jun. 16, 1997 (JP) .............................. 9-158915
Jun. 16, 1997 (JP) .............................. 9-158916

(51) Int. Cl.[7] .................. H04N 5/262; H04N 5/76; H04N 5/222; H04N 1/387
(52) U.S. Cl. ............. 348/239; 348/231.2; 348/333.12; 348/333.02; 358/450
(58) Field of Search ................. 348/232, 239, 348/333.01, 333.02, 333.11, 333.12, 231, 231.2; 358/450, 540; 382/284

(56) References Cited

U.S. PATENT DOCUMENTS

| 5,016,112 A | * | 5/1991 | Nakajima et al. ............. 386/38 |
| 5,175,629 A | * | 12/1992 | Lee et al. ...................... 386/38 |
| 5,459,819 A | * | 10/1995 | Watkins et al. ............. 358/1.18 |
| 5,477,264 A | * | 12/1995 | Sarbadhikari et al. ...... 348/231 |
| 5,559,554 A | * | 9/1996 | Uekane et al. ............. 348/333 |
| 5,587,740 A | * | 12/1996 | Brennan ..................... 348/373 |
| 5,633,678 A | * | 5/1997 | Parulski et al. ............. 348/232 |
| 5,748,326 A | * | 5/1998 | Thompson-Bell et al. .. 358/296 |
| 5,805,237 A | * | 9/1998 | Nakatani et al. ............ 348/589 |
| 5,815,645 A | * | 9/1998 | Fredlund et al. ............ 358/450 |
| 5,867,282 A | * | 2/1999 | Fredlund et al. ............ 358/450 |
| 5,870,771 A | * | 2/1999 | Oberg ........................ 707/502 |
| 5,883,610 A | * | 3/1999 | Jeon ........................... 345/113 |
| 5,923,406 A | * | 7/1999 | Brasington et al. ........... 355/40 |
| 6,111,950 A | * | 8/2000 | Fredlund et al. ............ 713/186 |
| 6,144,388 A | * | 11/2000 | Bornstein .................... 345/435 |
| 6,151,421 A | * | 11/2000 | Yamada ....................... 382/284 |
| 6,157,744 A | * | 12/2000 | Nagasaka et al. ........... 382/236 |
| 6,181,836 B1 | * | 1/2001 | Delean ........................ 382/302 |
| 6,201,571 B1 | * | 3/2001 | Ota ............................. 348/239 |

* cited by examiner

Primary Examiner—Wendy R. Garber
Assistant Examiner—John M. Villecco
(74) Attorney, Agent, or Firm—Pennie & Edmonds LLP

(57) ABSTRACT

A digital camera comprises a pick-up image data memory for storing pick-up image data by a couple charged device (CCD), a title message table for storing a plurality of title message data to be superimposed over the pick-up image data and a plate table for storing a plurality of plate image data to be overwritten the title message data and a central processing unit (CPU). The CPU overwrites the title message data stored in the title message table on the plate image data stored in the plate table and superimposed the title message data with the plate image data over the pick-up image data stored in the pick-up data memory. Further, the CPU stored the superimposed pick-up image data in the pick-up image memory so that the superimposed image data can be reproduced following the original pick-up image data.

8 Claims, 26 Drawing Sheets

FIG.3

STANDARD TITLE MESSAGE TABLE

34a

| REFERENCE NUMBER DATA | STANDARD TITLE MESSAGE |
|---|---|
| 1 | Congratuations |
| 2 | Happy Birthday |
| 3 | My Family |
| 4 | good !! |
| 5 | Happy New Year |
| 6 | Merry Christmas ! |
| ⋮ | ⋮ |

FIG.4

TITLE CHARACTER TABLE

SELECTING ORDER BY "+" KEY →

SELECTING ORDER BY "-" KEY ↓

| あ | い | う | え | お | A | B | C | D | E |
|---|---|---|---|---|---|---|---|---|---|
| か | き | く | け | こ | F | G | H | I | J |
| さ | し | す | せ | そ | K | L | M | N | O |
| た | ち | つ | て | と | P | Q | R | S | T |
| な | に | ぬ | ね | の | U | V | W | X | Y |
| は | ひ | ふ | へ | ほ | Z | ; | ' | ? | , |
| ま | み | む | め | も | ぁ | ぃ | ぇ | ぉ | っ |
| や | ( | ゆ | ) | よ | ゃ | ゅ | ょ | ー | ! |
| ら | り | る | れ | ろ | 1 | 2 | 3 | 4 | 5 |
| わ | を | ん | ゛ | ゜ | 6 | 7 | 8 | 9 | 0 |

TITLE CHARACTER COLOR TABLE

34c

| REFERENCE NUMBER DATA | COLOR CODE |
|---|---|
| 1 | C_COL1  (BLACK) |
| 2 | C_COL2  (WHITE) |
| 3 | C_COL3  (RED) |
| 4 | C_COL4  (BLUE) |
| 5 | C_COL5  (GREEN) |
| 6 | C_COL6  (YELLOW) |
| 7 | C_COL7  (BROWN) |
| 8 | C_COL8  (VIOLET) |
| 9 | C_COL9  (PINK) |
| 10 | C_COL10 (YELLOW-GREEN) |

PLATE TABLE 34d

| REFERENCE NUMBER DATA | PLATE IMAGE DATA |
|---|---|
| 1 |  |
| 2 |  |
| 3 |  |
| 4 |  |
| 5 |  |
| 6 |  |

FIG.7

PLATE COLOR TABLE

34e

| REFERENCE NUMBER DATA | COLOR CODE |
|---|---|
| 1 | P_COL1 (WHITE) |
| 2 | P_COL2 (BLACK) |
| 3 | P_COL3 (PINK) |
| 4 | P_COL4 (SKY BLUE) |
| 5 | P_COL5 (YELLOW-GREEN) |
| 6 | P_COL6 (ORANGE) |
| 7 | P_COL7 (GRAY) |
| 8 | P_COL8 (RED) |
| 9 | P_COL9 (BLUE) |
| 10 | P_COL10 (GREEN) |
| 11 | P_COL11 (YELLOW) |
| 12 | P_COL12 (VIOLET) |
| 13 | P_COL13 (BROWN) |

LUT FOR IMAGE PICK-UP

LUT FOR TITLE PICK-UP

IMAGE DATA PROCESSING APPARATUS METHOD AND PROGRAM STORAGE MEDIUM FOR PROCESSING IMAGE DATA

BACKGROUND OF THE INVENTION

1. Field of the Invention

The present invention relates to an image data processing apparatus, such as a digital still camera or a video camera, and more particularly to an image data processing apparatus having an image pick-up device, which picks up an optical image and generates digital image data, the apparatus capable of superimposing another image data over the digital pick-up image data.

2. Description of the Prior Art

Recently, certain models of an image data processing apparatus that picks up an optical image and generates digital pick-up image data, such as a digital still camera or a video camera, have a superimposing function for superimposing another image, such as a title message, date, etc., over the pick-up image data.

The conventional superimposing function provided for such an image data processing apparatus simply places another image, e.g., a title message, in a predetermined position of the pick-up image without any modification of the images. Therefore, when the title message laying on the pick-up image was a similar color to that of the pick-up image, the title image would blend into the pick-up image, so that the title message causes unclear. In such case, the user has to give up superimposing the title message over the pick-up image.

Further, in the conventional superimposing function, original pick-up image data is deleted from a memory after the superimposed pick-up image data has been stored in the memory. Therefore, the user cannot compare the original pick-up image data with the superimposed pick-up image data. To solve this problem, some prior art has proposed using another superimposing function that has the capability of retaining both of the original pick-up image data and the superimposed pick-up image data in the memory. However, since the two images are not related during the reproducing process, these two images cannot be reproduced sequentially, and the user still has trouble finding these two images from the memory and comparing them.

Furthermore, some models of a conventional image data processing apparatus having the superimposing function provide the user with a plurality of pre-stored images to be superimposed over the pick-up image data. The user can select a desired image from the prestored images and superimpose it over the pick-up image. However, it is likely that the user cannot find an image suitable for the pick-up image from the pre-stored images. On the other hand, other models of a conventional image data processing apparatus are provided with a message input device, which is detachable to a main body of the apparatus and can input various messages to be superimposed over the pick-up image. However, such a message input device diminishes the portability of the apparatus.

SUMMARY OF THE INVENTION

The present invention provides an image data processing apparatus and a method for processing image data which are always capable of preparing a conspicuous image superimposed over a pick-up image.

This is achieved in accordance with a specific embodiment of the present invention by an image data processing apparatus, which comprises: image pick-up means for picking up an optical image and producing electric pick-up image data corresponding to the optical image; pick-up data storing means for storing a plurality of pick-up image data produced by the image pick-up means; pick-up data selecting means for selecting one of the pick-up image data stored in the pick-up data storing means; first storing means for storing a plurality of first image data; first selecting means for selecting one of the first image data stored in the first storing means; second storing means for storing a plurality of second image data; second selecting means for selecting one of the plurality of second image data stored in said second storing means; first superimposing means for superimposing the selected first image data selected by the first selecting means over the selected second image data selected by the second selecting means and producing superimposed image data; and second superimposing means for superimposing the superimposed image data superimposed by the first superimposing means over the selected pick-up image data selected by the pick-up data selecting means.

The present invention also provides a method for processing image data, which comprises an image pick-up step for picking up an optical image and producing electric pick-up image data corresponding to the optical image; a pick-up data storing step for storing a plurality of the pick-up image data produced by the image pick-up step; a pick-up data selecting step for selecting one of the pick-up image data stored by the pick-up data storing step; a first selecting step for selecting first image data stored in a first memory; second selecting step for selecting second image data stored in a second memory; a first superimposing step for superimposing the selected first image data selected by the first selecting step over the selected second image data selected by the second selecting step and for producing superimposed image data; and a second superimposing step for superimposing the superimposed image data superimposed by the first superimposing step over the selected pick-up image data selected by the pick-up data selecting step.

Further, the present invention provides an image data processing apparatus and a method for processing image data, which make it easier for a user to compare an original pick-up image with a superimposed pick-up image based on the original image.

This is achieved by an image data processing apparatus, which comprises: image pick-up means for picking up an optical image and producing electric pick-up image data corresponding to the optical image; pick-up data storing means for storing a plurality of the pick-up image data produced by the image pick-up means; sequential access means for sequentially accessing the pick-up image data stored in the pick-up image storing means in predetermined order; pick-up data selecting means for selecting one of the pick-up image data stored in the pick-up data storing means; image data modifying means for modifying the selected pick-up image data selected by the pock-up data selecting means; and writing means for writing the modified pick-up image data in the pick-up data storing means in order to access the selected pick-up image data and the modified pick-up image data in sequence by the sequential access means.

The present invention also provides a method for processing image data, which comprises an image pick-up step for picking up an optical image and producing electric pick-up image data corresponding to the optical image; a pick-up data storing step for storing the pick-up image data produced by the image pick-up step; a pick-up data selecting step for selecting the pick-up image data stored by the pick-up data storing step; an image data modifying step for modifying the selected pick-up image data selected by the pock-up data selecting step; a storing step for storing the modified pick-up image data; and a reproducing step for reproducing the selected pick-up image data and the modified pick-up image data in sequence.

Furthermore, the present invention provides an image data processing apparatus, a method for processing image data and a program storage medium for processing image data which allow the user to prepare an image to be superimposed over the pick-up image data and to use it at any time without any other devices to be connected to the apparatus.

This is achieved by an image processing apparatus which comprises image pick-up means for picking up an optical image and producing electric pick-up image data corresponding to the optical image; pick-up mode selecting means for selecting one of a first mode and a second mode; first modifying means for modifying the pick-up image data produced by the image pick-up means when the pick-up mode selecting means selects the second mode; first pick-up data storing means for storing the pick-up image data produced by the image pick-up means when the pick-up mode selecting means selects the first mode; second pick-up data storing means for storing the modified pick-up image data modified by the modifying means when the pick-up mode selecting means selects the second mode; and first superimposing means for superimposing the modified pick-up image data stored in the second pick-up data storing means over the pick-up image data stored in the first pick-up data storing means.

The present invention also provides a method for processing image data, which comprises a pick-up mode detecting step for detecting one of a first mode and a second mode; an image pick-up step for picking up an optical image and producing electric pick-up image data corresponding to the optical image; a first pick-up data storing step for storing the pick-up image data produced by the image pick-up step when the first mode is detected by the pick-up mode detecting step; a modifying step for modifying the pick-up image data produced by the image pick-up means when the second mode is detected by the pick-up mode detecting step; a second pick-up data storing step for storing the modified pick-up image data modified by the modifying step when the second mode is detected by the pick-up mode detecting step; and a first superimposing step for superimposing the modified pick-up image data stored by the second pick-up data storing step over the pick-up image data stored by the first pick-up data storing step.

Further, the present invention provides a program storage medium for processing image data, which comprises a pick-up mode detecting module for detecting one of a first mode and a second mode; an image pick-up module for picking up an optical image and producing electric pick-up image data corresponding to the optical image; a first pick-up data storing module for storing the pick-up image data produced by the performance of the image pick-up module when the first mode is detected by the performance of the pick-up mode detecting module; a modifying module for modifying the pick-up image data by the performance of the image pick-up module when the second mode is detected by the performance of the pick-up mode detecting module; a second pick-up data storing module for storing the modified pick-up image data modified by the performance of the modifying module when the second mode is detected by the performance of the pick-up mode detecting module; and a first superimposing module for superimposing the modified pick-up image data stored by the performance of the second pick-up data storing module over the pick-up image data stored by the performance of the first pick-up data storing module.

BRIEF DESCRIPTION OF THE DRAWINGS

FIG. 3 is a diagram illustrating a title message table of the camera shown in FIG. 1.

FIG. 4. is a diagram illustrating a title character table used in a specific embodiment of the present invention.

FIG. 5 is a diagram illustrating a title character color table used in a specific embodiment of the present invention.

FIG. 7 is a diagram illustrating a plate color table used in a specific embodiment of the present invention.

DETAILED DESCRIPTION OF PREFERRED EMBODIMENTS OF THE INVENTION

Preferred embodiments of the present invention will be described with reference to the drawings.

Figure 1:
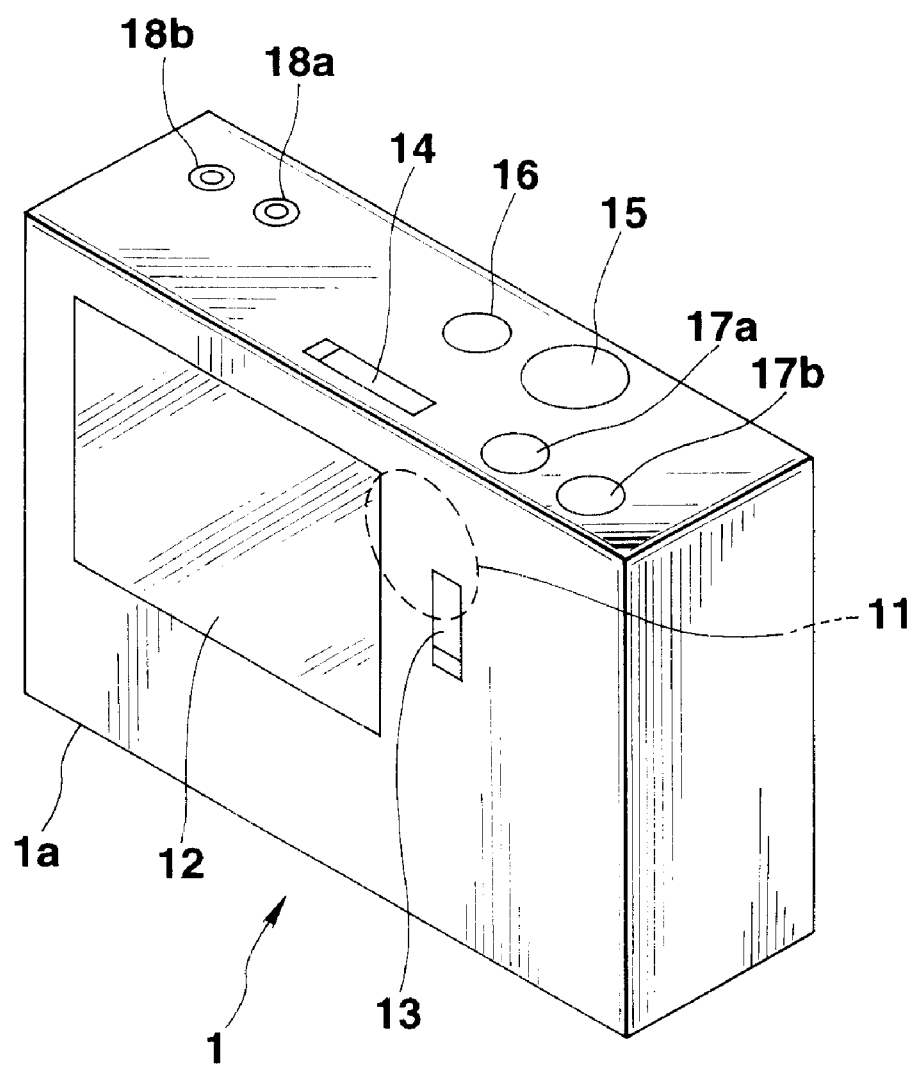
FIG. 1 is a perspective view of a digital camera employing the present invention.

FIG. 1 shows an outer view of a digital camera (an electronic still camera) 1 employing the present invention.

The camera 1 has a pick-up lens 11 (shown by a single-doted chain line in FIG. 1) mounted on a rear face of a main housing 1aOn the front face of the main housing 1a, a display unit 12, which may include a liquid crystal display (LCD) is mounted. The display unit 12 can display an image of an object, which is being picked up through the lens 11 in an image pick-up mode, which will be described later, and reproduces an image based on image data stored in a flash memory 31 in a reproducing mode which will be also described later. A mode selecting switch 13 is mounted on the right side of the display unit 12 of the housing 1a. The mode selecting switch 13 is for selecting one of the image pick-up mode, the reproducing mode, a data communication mode and a title image superimposing mode by a manual vertically sliding operation.

On addition, on the upper face of the housing 1a, is mounted a power switch 14 for turning the camera 1 on and off, a trigger switch 15 for taking a picture as a still image and for determining a parameter and data, a cancel key 16 for canceling a process, a "+" key 17a and a "–" key 17b for changing the parameter and data to be determined.

On the housing 1a is also mounted a serial terminal 18a, functioning to send image data and control data to and receive data from an external apparatus and a video output terminal 18 to output video signals to an external apparatus.

In specific embodiment, the camera 1 may comprise two separate bodies, a camera body and a main body. The camera body has the lens 11 and is rotatably or detachably mounted to the main body, so that the lens 11 can be pointed to various directions regardless of the direction to which the main body is facing by the rotation or removal of the camera body with respect to the main body.

Figure 2:
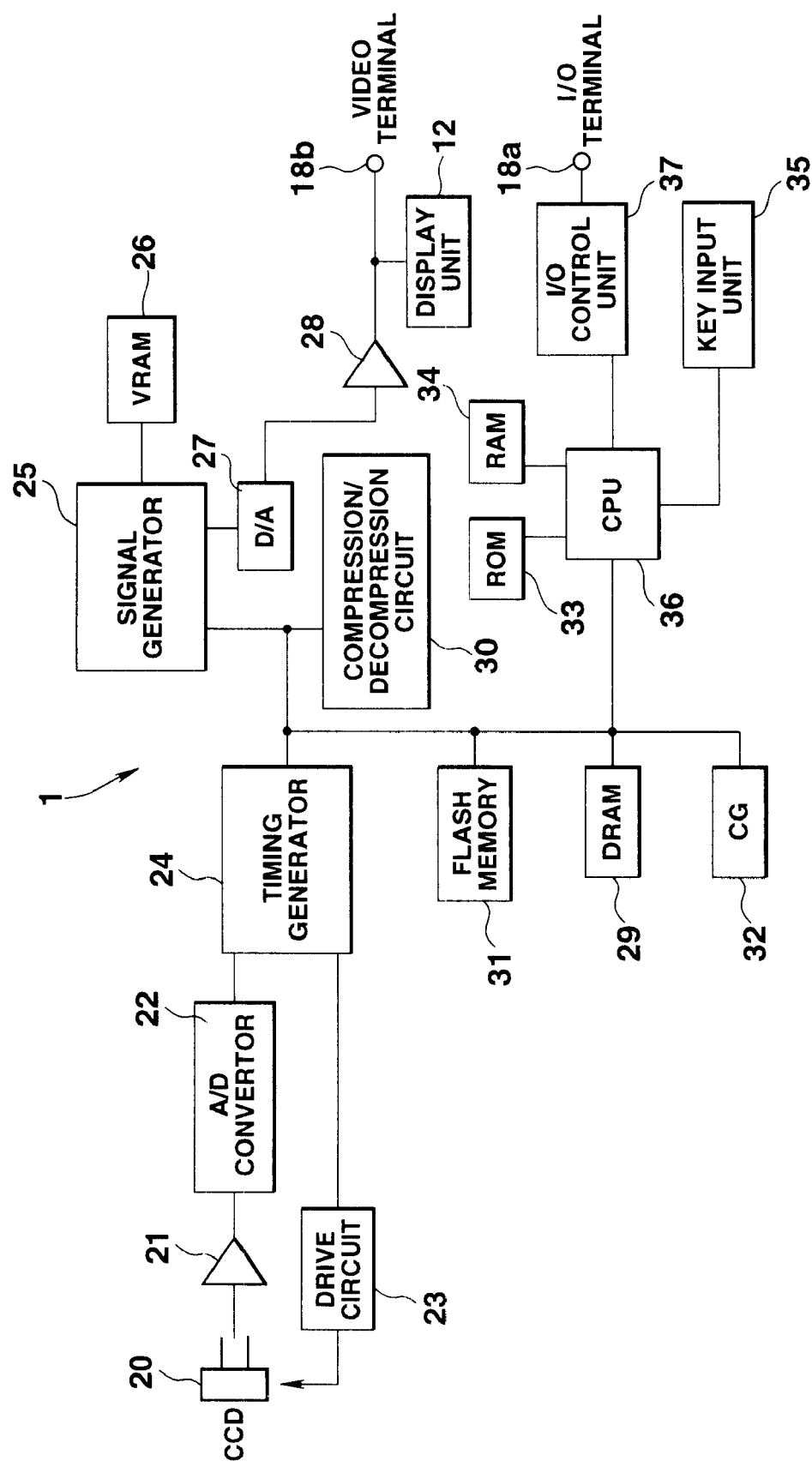
FIG. 2 is a block diagram of the camera shown in FIG. 1.

FIG. 2 is a block diagram showing a circuit of the camera 1.

As shown, in the specific preferred embodiment illustrated in FIG. 2, the camera 1 comprises the display unit 12 shown in FIG. 1, a charge coupled device (CCD) 20, a buffer 21, an analog/digital (A/D) convertor 22, a drive circuit 23, a timing generator 24, a signal generator 25, a video random access memory (VRAM) 26, a digital/analog (D/A) convertor 27, a buffer 28, a dynamic random access memory (DRAM) 29, a compression/decompression circuit 30, a flash memory 31, a character generator (CG) 32, a read only memory (ROM) 33, a random access memory (RAM) 34, a key input unit 35, a central processing unit (CPU) 36 and an input/output (I/O) control unit 37.

Specifically, the CCD 20 has a pixel surface on which a plurality of pixel elements comprising a light detecting section, such as a photo diode, and signal transfer electrodes disposed over the light detecting section are arranged, and an output section for providing the buffer 21 with voltage corresponding to electronic charge in each pixel element. When an optical image is focused on the pixel surface through the lens 11, each pixel element is charged the electronic charge corresponding to the luminosity of the optical image. The electric charge of each pixel element is sequentially output through the output section as a pick-up image signal (an analog signal) by one pixel element by one based on drive signals supplied from the drive circuit 23. The CCD 20 supplies the pick-up image signal to the A/D convertor 22 though the buffer 21.

The A/D convertor 22 converts the analog signal supplied from the CCD 20 into a digital signal and supplies the digital signal to the timing generator 24.

The drive circuit 23 controls the exposure period of the CCD 20 and the output timing of the analog signal from the CCD 20, based on timing signals supplied from the timing generator 24.

The timing generator 24 generates the timing signals for controlling the drive circuit 23 based on an image pick-up instruction signal provided from the CPU 36.

The signal generator 25 produces image data which includes a luminosity data and a chromatical data, performing a chromatical arithmetic processing on the digital pick-up image signal supplied from the timing generator 24, and supplies the image data to the DRAM 29. In addition, the signal generator 25 produces a digital video signal by adding synchronous signals to the image data output from the DRAM 29 under the control of the CPU 36, and then supplies the video signal to the VRAM 26. Furthermore, the signal generator 25 supplies the video signal stored in the VRAM 26 to the display unit 12 through the D/A convertor 18b and the buffer 28. The signal generator 25 also supplies the video signal to the video output terminal 18b when the video output terminal 18b is connected to the external apparatus with a video cable.

The VRAM 26 stores the digital video signal produced by the signal generator 25.

The D/A convertor 27 converts the digital video signal provided from the VRAM 26 though the signal generator 25 into an analog video signal and supplies the analog video signal to the display unit 11 through the buffer 28, and also to the external apparatus, when it connects to the video terminal 18b.

The display unit 12 includes a liquid crystal display or the like and displays the image corresponding to the video signal supplied through the D/A convertor 27 and the buffer 28.

The DRAM 29 temporally stores the image data supplied from the signal generator or a decompressed image data output from the flash memory 31. The DRAM 29 is also used as a work area when a title image data is superimposed over the pick-up image data.

The compression/decompression circuit 30 compresses the image data stored in the DRAM 29 in a certain encoding manner. For example, the compression/decompression circuit 30 performs Joint Photographic Expert Group (JPEG) algorithm, which uses Discrete Cosine Transform (DCT) for every 8×8 matrix pixels, a quantization and/or Huffman coding depending on a type of image data to be processed. The compression/decompression circuit 30 provides the compressed image data to the flash memory 31. The compression/decompression circuit 30 also compresses the image data over which the title image data has been superimposed in the same compression manner, and supplies the compressed image data to the flash memory 31. Further, the compression/decompression circuit 30 decompresses the compressed image data stored in the flash memory 31 in a certain decoding manner, and provides the decompressed image data to the DRAM 29.

The flash memory 31 stores a plurality of the compressed image data compressed by the compression/decompression circuit 30. The flash memory 30 also stores an address table with respect to the image data stored therein. The address table contains page number data to identify each image data stored in the flash memory 31, and address data which links to the page number data and represents the area of the flash memory 31 in which the image data being identified by the linked page number data is stored.

The CG 32 stores character image data, such as alphabets and numbers, which represents an actual image to be displayed on the display unit 12.

The ROM 33 stores various process programs, such as a superimposing process program (see FIGS. 8 and 9), which is performed by the CPU 36 for controlling each component of the camera 1. The ROM 33 also stores a basic control program which is used to perform a basic control process by the CPU 36. Further, the ROM 33 stores a pre-stored title message table 34a (see FIG. 3), a title character table 34b (see FIG. 4), a character color table 34c (see FIG. 5), a plate table 34d (see FIG. 6) and a plate color table 34e (see FIG. 7), all of which contain data and control codes necessary to prepare the title image data to be superimposed over the pick-up image data. In the superimposing process, these tables stored in the ROM 33 are duplicated to the RAM 34.

The RAM 34 is used as a work area for temporally storing various data to be processed by the CPU 36 in various processes. Further, as described above, the RAM 34 has duplicates of the pre-stored title message table 34a, the title character table 34b, the character color table 34c, the plate table 34d and the plate color table 34e from the ROM 33 in the superimposing process.

FIG. 3 shows the pre-stored title message table 34a, which is duplicated to the RAM 34.

The pre-stored message table 34a contains prestored title message data, such as "CONGRATULATIONS" and "HAPPY NEW YEAR", etc., and reference number data linking to each pre-stored title message data. Each title message data comprises a plurality of character codes representing each letter or symbol composing the message.

FIG. 4 shows the title character table 34b which is duplicated to the RAM 34.

The title character table 34b contains character code, such as alphabets and numbers, which are used for preparing a desired title message by the user. In the title superimposing process, the title character codes are selected by the depression of the "+" key 17a, the "−" key 17b and the trigger switch 15 for determining one of the title character data to compose a desired title message.

FIG. 5 shows the title character color table 34c which is duplicated to the RAM 34.

The title character color table 34c contains color codes for controlling the color of the title characters and reference number data linking to each color code.

Figure 6:
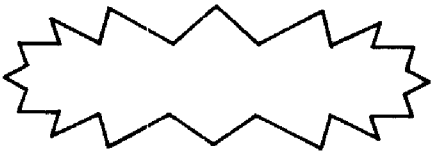
FIG. 6 is a diagram illustrating a plate table used in a specific embodiment of the present invention.
Figure 6:
Figure 6:
Figure 6:
Figure 6:
Figure 6:

FIG. 6 shows the plate table 34d which is duplicated to the RAM 34.

The plate table 34d contains a plurality of plate image data, which are different in shape from each other, and reference number data linking to each plate image data. In the superimposing process, the plate image data is used as a background image of the title message. The plate data is stored in a compressed binary image data format.

FIG. 7 shows the plate color table 34e which is duplicated to the RAM 34.

The plate color table 34e contains color codes for controlling the color of the plate, and reference number data linking to each color code.

The key input unit 35 comprises the mode switch 13, the power switch 14, the trigger switch 15, the cancel key 16, the "+" key 17a and the "−" key 17b, and supplies various key input signals to the CPU 36 corresponding to the depression, or a sliding position of the switches and keys.

The CPU 36 controls all processes of the camera 1 in order to perform its functions in response to the key input signals output from the key input unit 35 and the various process programs stored in the ROM 33.

The I/O control unit 37 controls serial data communication. The I/O control unit 37 converts parallel data provided from the CPU 36 into serial data and provides the I/O terminal 37 with the serial data together with control data. Further, the I/O control unit 37 converts serial data received from an external apparatus through the I/O terminal 37 into parallel data and provides the parallel data to the CPU 36.

The I/O (Input/Output) terminal 37 is an interface which is used to send serial data to and receive them from the external apparatus which is connected by a communication cable.

The operation of the camera 1 set forth above in a preferred embodiment will be described next.

In the image pick-up mode selected by the mode selecting switch 13, the display unit 12 displays an object focused on the CCD 20. When the trigger switch 15 is depressed, the CPU 36 performs an operation of picking up an image and storing the pick-up image data in the flash memory 31. Under the control of the CPU 36, the image signals generated by the CCD 20 are supplied to the A/D convertor 22 through the buffer 21 and are converted into the digital image signal by the A/D convertor 22. The digital image signal is supplied from the A/D convertor 22 to the signal generator 25 through the timing generator 24. The signal generator 25 performs the chromatical arithmetic process on the digital image signal and produces the pick-up image data including the luminosity data and the chromatical data. The pick-up image data is temporally stored in the DRAM 29. The image data is transferred from the DRAM 29 to the compression/decompression circuit 30 where it is compressed. The compressed pick-up image data is stored in the flash memory 31 under the address control of the CPU 36. The CPU 36 provides the pick-up image data stored in the flash memory 31 with a page number data and writes the page number data in the address table stored in the flash memory 31. The page number is provided for the pick-up image data in chronological order. The address table also stores the address data representing the area of the flash memory 31 in which the pick-up image data is stored.

Figure 8:
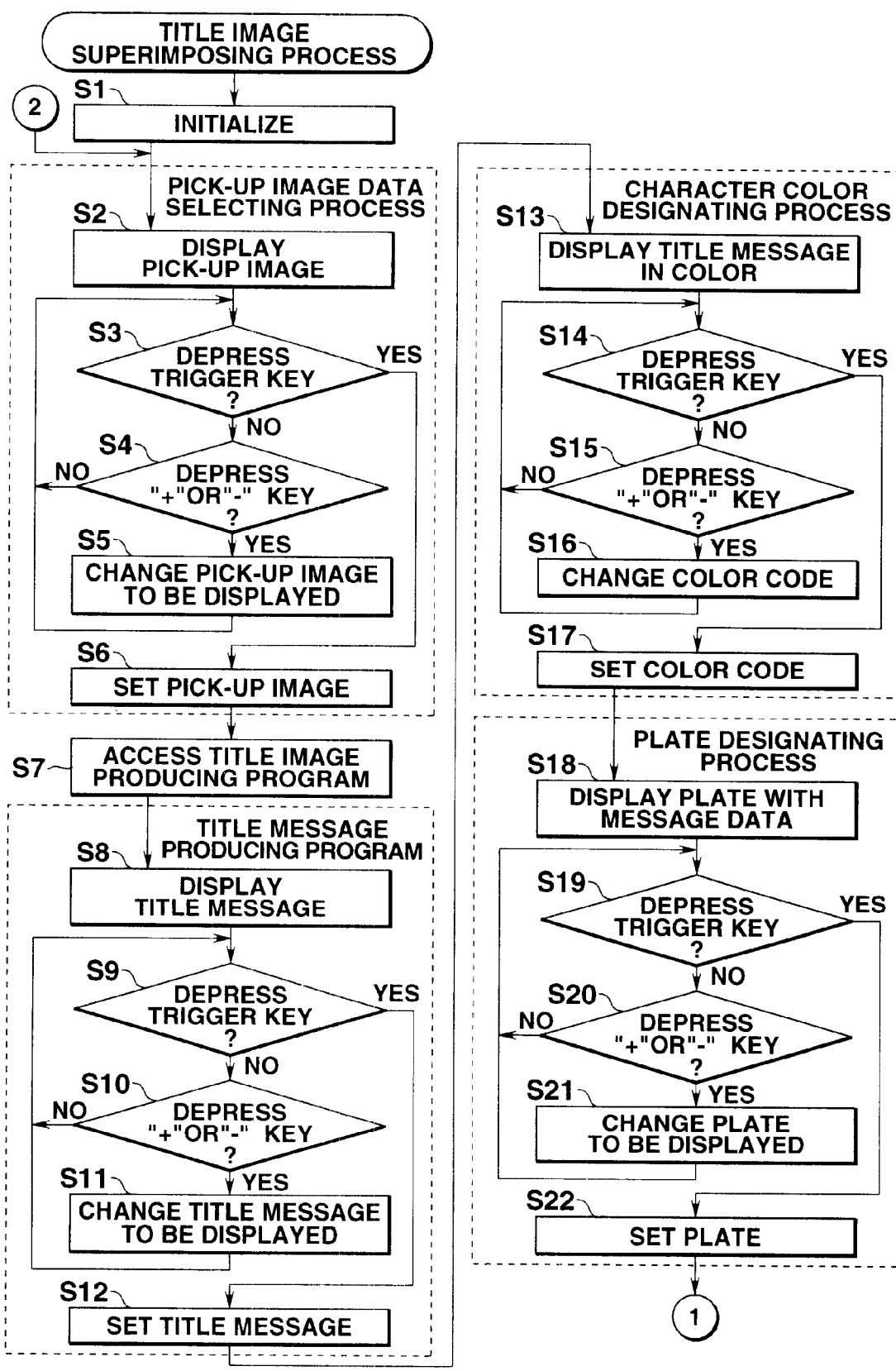
FIGS. 8 and 9 are flow charts illustrating a superimposing process used in a specific embodiment of the present invention.
Figure 9:
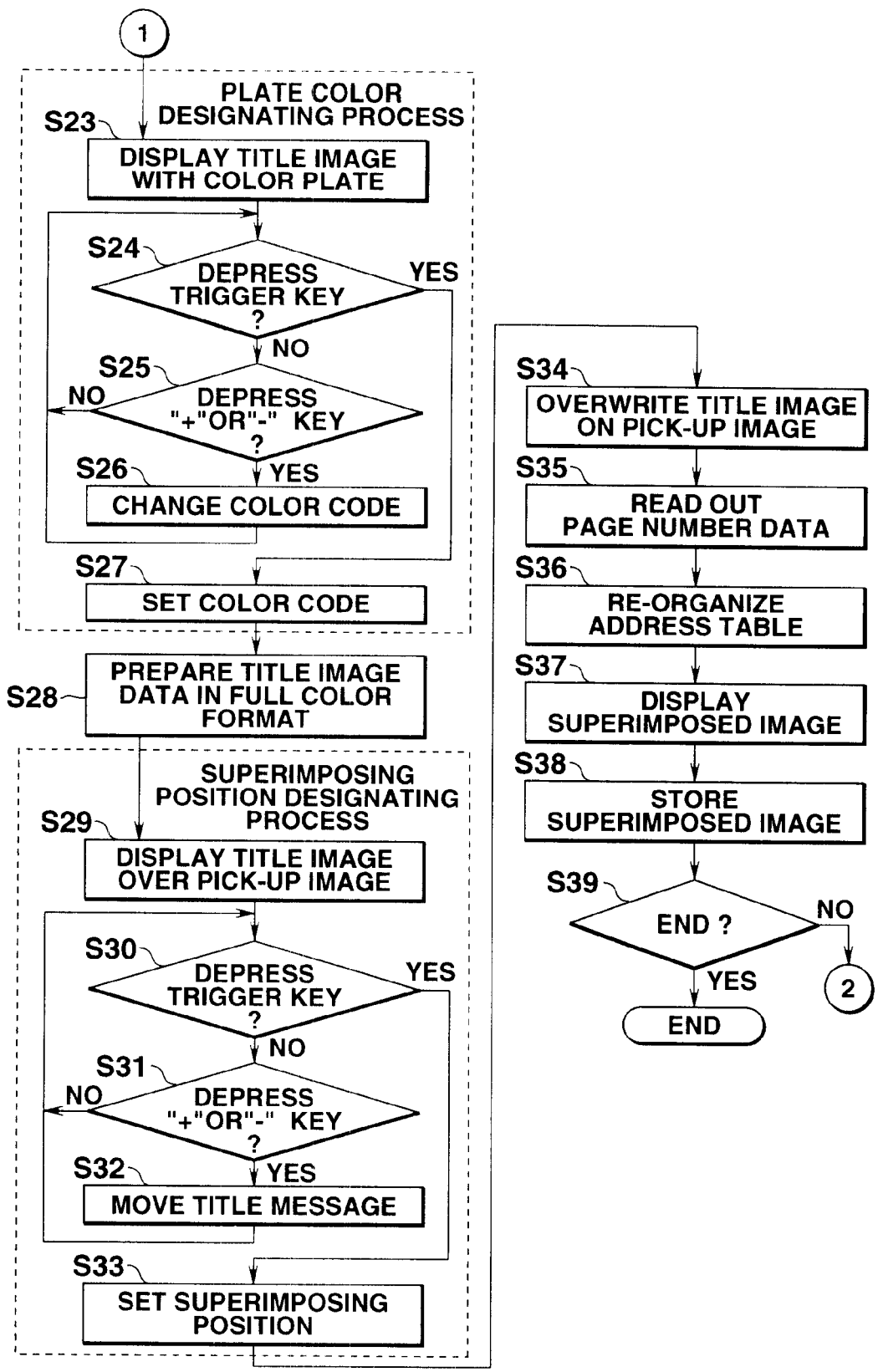

In the title image superimposing mode selected by the mode selecting switch 13, the CPU 36 performs the superimposing precess corresponding to flow charts shown in FIGS. 8 and 9.

First, the CPU 36 performs an initializing operation, and then duplicates the tables 34a–34e stored in the ROM 33 to the RAM 34 (step S1).

Second, the CPU 36 performs a pick-up image selecting process. The CPU 36 reads out the pick-up image data corresponding to the page number data "1" from the flash memory 31 looking up the address table stored in the flash memory 31. The image data read out from the flash memory 31 is decompressed by the compression/decompression circuit 30. The decompressed pick-up image data is stored in the DRAM 29. The CPU 36 reads out the pick-up image data stored in the DRAM 29 and supplies it to the signal generator 25. The signal generator 25 converts the pick-up image data into the digital video signal and supplies the digital video signal to the VRAM 26. Further, the signal generator 25 sequentially supplies the digital video signal stored in the VRAM 26 to the D/A convertor 27. The D/A convertor 21 converts the digital video signal into the analog video signal and supplies the analog video signal to the display unit 12 through the buffer 28. The display unit 12 displays the pick-up image corresponding to the video signal (Step S2). The CPU 36 detects whether or not the trigger switch 15 is depressed (Step S3) and whether or not the "+" key 17*a* or the "−" key 17*b* is depressed (Step S4). When the "+" key 17*a* is depressed (Step S4), the CPU 36 performs the same operation of the step S2 on the pick-up image data corresponding to the page number data "2" (Step S5). Consequently, the display unit 12 displays the image based on the pick up image data corresponding to the page number data "2" (Step S5). When the "−" key 17*b* is depressed during displaying the image based on the pick-up image data corresponding to the page number data "2" on the display unit 12, the CPU 36 performs the same operation of the step S2 on the pick-up image data corresponding to the page number data "1" (Step S5). That is, the CPU 36 changes the pick-up image data to be displayed on the display unit 12 to the pick-up image data corresponding to the next or the previous page number data to that which corresponds to the displaying image data, every time when the "+" key or the "−" key is depressed. When the trigger switch 15 is depressed, the image data which is selected at the time of the depression of the trigger switch 15 is determined as the image data to be superimposed the title image (Step S6). The CPU 36 stores the page number data corresponding to the designated pick-up image and another necessary data in the RAM 34. In this manner, the user can watch each pick-up image data stored in the flash memory 31 and select a desired pick-up image data.

Figure 10A:
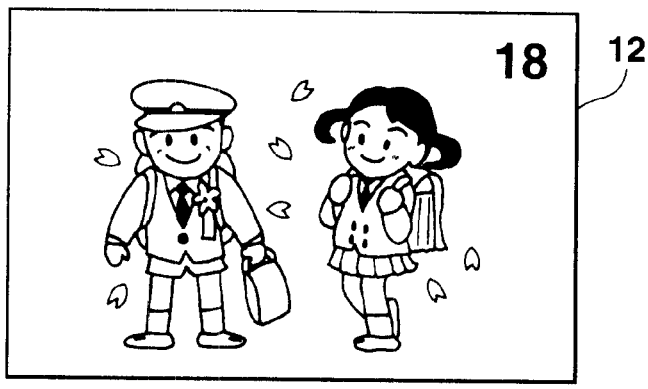
FIGS. 10A–13D are diagrams illustrating an image displayed on a display unit in the superimposing process used in a specific embodiment of the present invention.

FIG. 10A shows a display image when the image data corresponding to the page number data "18" is displayed on the display unit 12.

After the pick-up image data is designated, the CPU 36 accesses a title image producing program stored in the ROM 33 (Step S7). First, the CPU 36 performs a process of reproducing the title message. The CPU 36 reads out the pre-stored title message data corresponding to the reference number data "1" from the pre-stored title message table 34*a* stored in the RAM 34. The title message data is supplied to the CG 32. The CG 32 generates the character image data based on the character code included in the message data and supplies the character image data to the signal generator 25. The signal generator 25 converts the character image data into the digital video signal and supplies the digital video signal to the VRAM 26. The display unit 12 displays the title message corresponding to the video signal stored in the VRAM 26 (Step S8). The CPU 36 detects whether or not the trigger switch 15, the "+" key 17*a* or the "−" key 17*b* is depressed (Steps S9 and S10). The CPU 36 changes the title message data to be displayed on the display unit 12 to the title message data corresponding to the next or the previous reference number data to that which corresponds to the displaying message data every time when the "+" key or the "−" key is depressed (Steps S10 and S11). That is, the CPU performs the same operation of the step S8 on the title message data corresponding to the next or the previous reference number data. Consequently, the display unit 12 displays another title message. When the trigger switch 15 is depressed (Step S9), the CPU 36 stores the title message data which is selected at the time of the depression of the trigger switch 15 in the RAM 34 in binary image data format (Step S12).

Figure 10B:
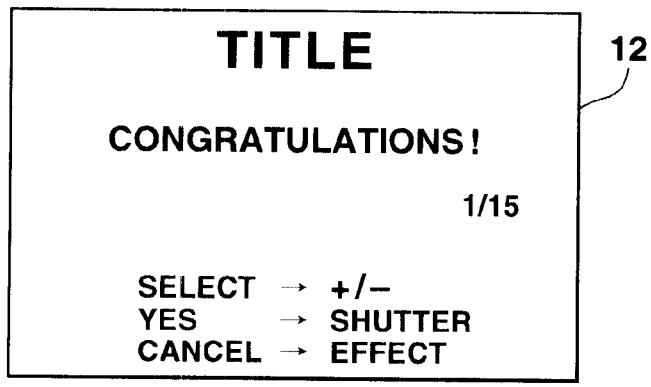
Figure 10C:
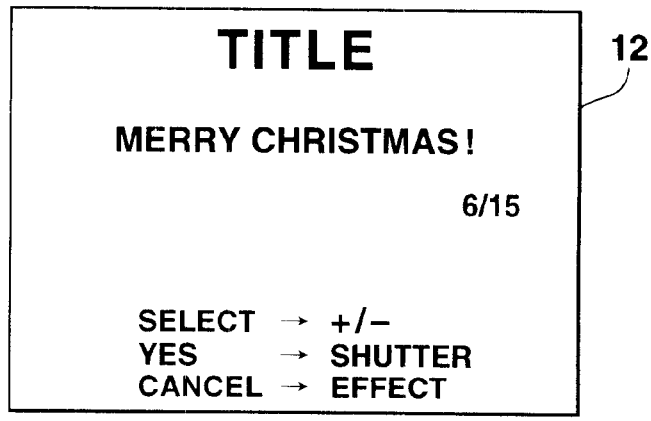

FIGS. 10B and 10C show the display unit 12 displaying the title message. In FIG. 10B, "1/15" displayed on the lower left of the message data "CONGRATULATIONS" indicates that fifteen message data are contained in the table 34*a* and the title message data which is now being displayed is corresponded to the reference number data "1".

The title message may be freely composed using the title character table 34*b*. That is, the user can select a letter or symbol from the title character table 34*b* using the "+" key 17*a* and the "−" key 17*b* and compose a desired title message. In an alternative embodiment, a touch panel may be disposed on the display unit 12 so that the user can enter a handwritten message as a title message. Further, the title message may be date data, generated by a clock/calendar circuit.

After the title message is designated, the CPU 36 performs a process of designating color of the title message. The CPU 36 reads out the color code (C_COR1 (black)) from the character color table 34*c* corresponding to the reference number data "1" and adds the color code to the designated message data stored in the RAM 34. The designated message data with the color code stored in the RAM 34 is supplied to the signal generator 25. The signal generator 25 converts the message data into the video signal representing the message image in the color (black) based on the color code. The display unit 12 displays the title message image in black (step S13). The CPU 36 detects whether or not the trigger switch 15, the "+" key 17*a* or the "−" key 17*b* is depressed (Steps S14 and S15). The CPU 36 changes the color code to be applied to the designated message data to the color code corresponding to the next or the previous reference number data to that corresponding to the color code which is applying the message data every time when the "+" key or the "−" key is depressed (Steps S15 and S16). That is, the CPU 36 performs the same operation of the step S13 on the color code corresponding to the next, or the previous reference number data. Consequently, the display unit 12 displays the designated title message in another color. When the trigger switch 15 is depressed (Step S14), the CPU 36 stores the message data with the color code which is selected at the time of the depression of the trigger switch 15, in a predetermined area of the RAM 34 in the binary image data format (Step S17).

Figure 11A:
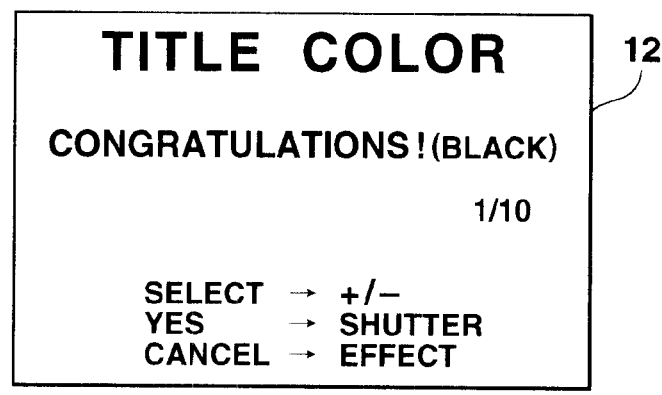
Figure 11B:
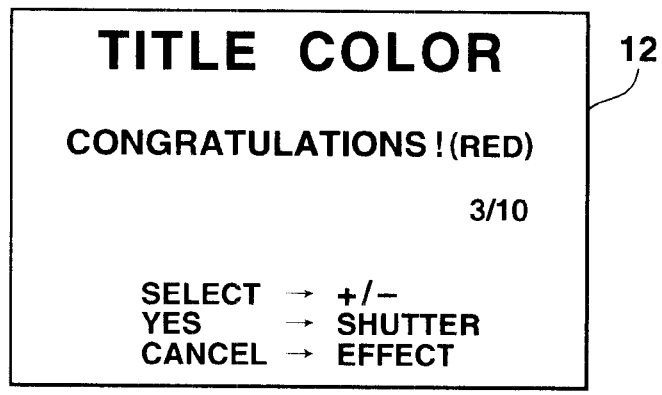
Figure 11C:
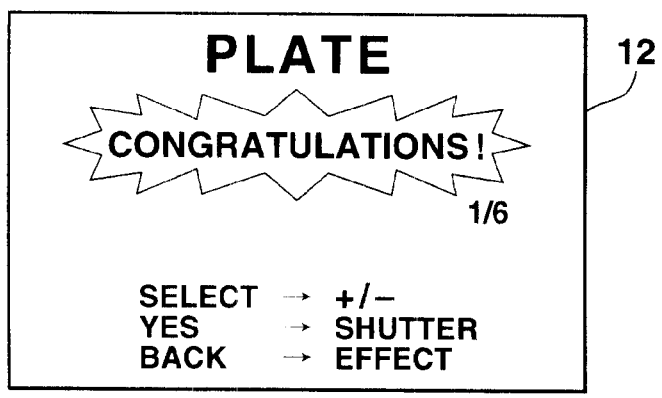

Thereafter, the CPU 36 performs a process for designating the plate. In this process, the CPU 36 reads out the plate image data from the plate table 34*d* corresponding to the reference number data "1". Since the plate image data stored in the plate table 34*b* is compressed, the plate image data is supplied to the compression/depression circuit 30 to decompress the plate image data. The decompressed plate image data is supplied to the RAM 34 and stored in the RAM 34. The CPU 36 reads out the message data with the color code from the RAM 34 and overwrites the message data with the color code on the plate image data stored in the RAM 34. That is, the CPU 36 puts the message data on the plate image data and makes a title image data. The title image data is supplied from the RAM 34 to the signal generator 25. The signal generator 25 converts the title image data into a digital video signal. The display unit 12 displays a title image corresponding to the video signal converted from the title image data as shown in FIG. 11C (step S18).

The CPU 36 detects whether or not the trigger switch 15, the "+" key 17*a* or the "−" key 17*b* is depressed (Steps S19 and S20). The CPU 36 changes the plate image data to be displayed to the plate image data corresponding to the next or the previous reference number data to that corresponding to the plate image data which is being displayed, every time when the "+" key or the "−" key is depressed (Steps S20 and S21). That is, the CPU 36 performs the same operation of the step S18 on the plate image data corresponding to the next, or the previous reference number data. Consequently, the display unit 12 displays the title image with another plate image. When the trigger switch 15 is depressed (Step S19), the CPU 36 stores the plate image data which is selected at the time of the depression of the trigger switch 15, in a predetermined area of the RAM 34 in the binary image data format and deletes the title image data stored in the RAM 34 (step S22). In a specific embodiment, the plate may be combined with another plate(s).

Figure 12A:
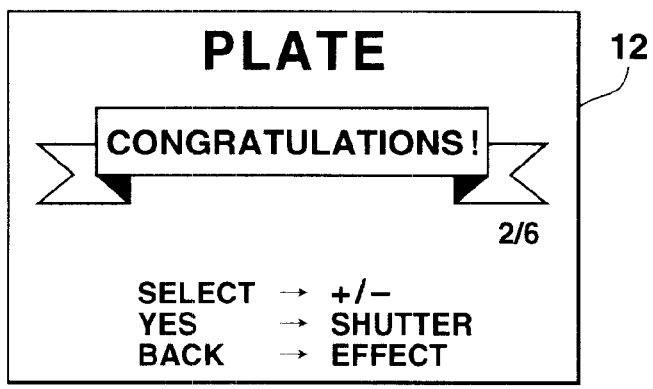
Figure 12B:
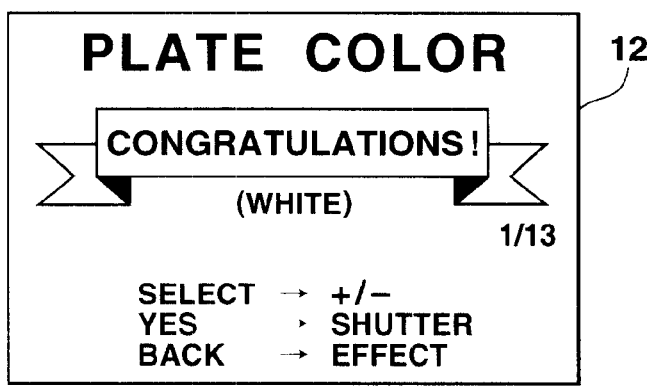

After the plate image data is designated, the CPU 36 performs a process of designating color of the plate. The CPU 36 reads out the color code (P_COR1 (white)) from the plate color table 34e corresponding to the reference number data "1" and adds the color code to the designated plate image data stored in the RAM 34. The CPU 36 reads out the message data from the RAM 34 and overwrites the message data on the plate image data with the color code stored in the RAM 34. That is, the CPU 36 puts the message data with the color code on the plate image data with the color code and makes a title image data with the color message and the color plate. The title image data is supplied from the RAM 34 to the signal generator 25. The signal generator 25 converts the title image data into a digital video signal. The display unit 12 displays a title image corresponding to the video signal converted from the title image data with the color title message and the white plate image as shown in FIG. 12B (step S23).

Figure 12C:
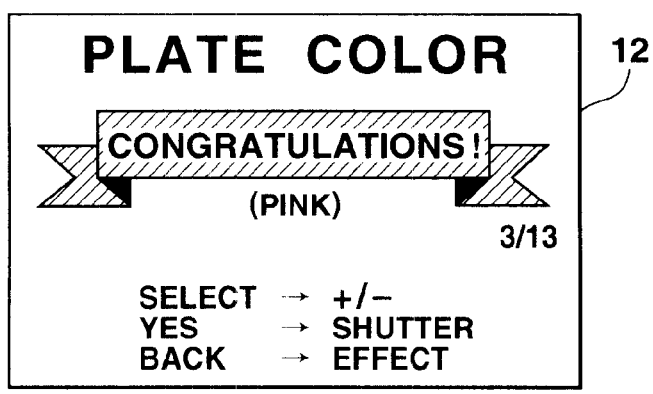

The CPU 36 detects whether or not the trigger switch 15, the "+" key 17a or the "−" key 17b is depressed (Steps S24 and S25). The CPU 36 changes the color code to be applied to the designated plate image data to the color code corresponding to the next or the previous reference number data to that corresponding to the color code which is applying the plate image data, every time when the "+" key or the "−" key is depressed (Steps S25 and S26). That is, the CPU 36 performs the same operation of the step S23 on the color code corresponding to the next or previous reference number code. Consequently, the display unit 12 displays the title message with the plate image in another color as shown in FIG. 12C. When the trigger switch 15 is depressed (Step S24), the CPU 36 stores the plate image data with the color code which is selected at the time of the depression of the trigger switch 15, in a predetermined area of the RAM 34 in the binary image data format (Step S27). Further, the CPU 36 overwrites the message data with color code over the plate image data with the color code on the RAM 34 and prepares the title image with the color message and the color plate in the binary image data format.

Thus, the title image data is designated in the above manner (steps S7–27). The CPU 36 provides the title image data from the RAM 34 to the signal generator 25. The signal generator 25 converts the title image data in the binary image data format into a full color image data format which is the same as that of the pick-up image data. The title image data in the full color image data format is stored in the RAM 34 (Step S28).

Figure 13A:
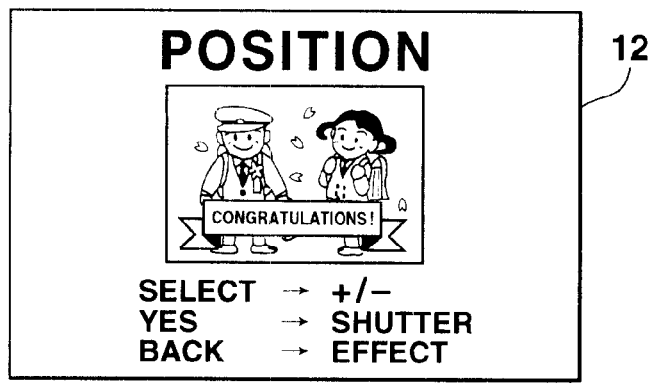
Figure 13B:
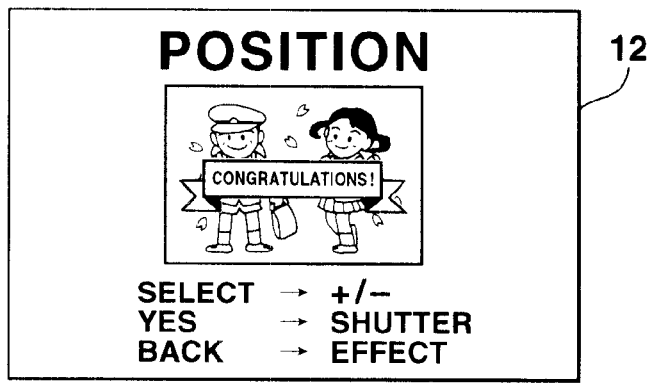
Figure 13C:
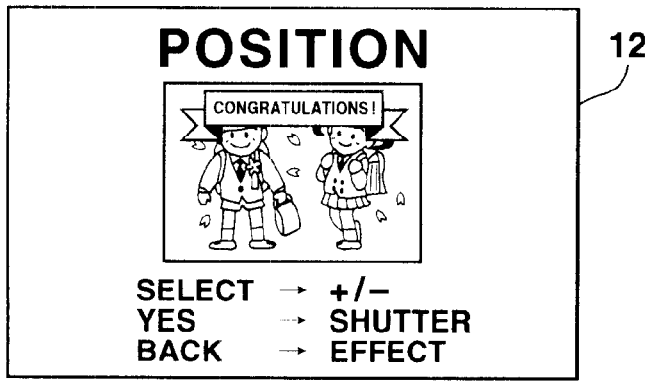
Figure 13D:

Thereafter, the CPU 36 performs a process of designating a position on which the title image data is superimposed over the pick-up image data designated in the step S6. The CPU 36 duplicates the pick-up image data stored in the DRAM 29 to the RAM 34. The CPU 36 overwrites the title image data on the default position in the duplicated pick-up image data stored in the RAM 34 and makes the superimposed image data. The superimposed image data is supplied to the signal generator 25 to be converted into the video signal and displayed on the display unit 12 as shown in FIG. 13A (Step S29). The CPU 36 detects whether or not the trigger switch 15, the "+" key 17a or the "−" key 17b is depressed (Steps S30 and S30). The CPU 36 moves the title image up or dawn on the pick-up image for predetermined pitch every time when the "+" key and the "−" key are depressed (Steps S31 and S32). That is, the CPU 36 re-duplicates the pick-up image data stored in the DRAM 29 to the RAM 31 and overwrites the title image data on an upper or lower position than the previous position in the pick-up image data, based on the depression of the "+" or "−" key 17a or 17b. Consequently, the display unit 12 displays the superimposed image data in which the title image has been moved up or down. When the trigger switch 15 is depressed (Step S30), the CPU 36 performs a process of overwriting the title image on the position which is designated at the time in the pick-up image data stored in the DRAM 29 (Step S33). The CPU 36 calculates the DRAM address corresponding to the designated position on which the title image is overwritten on the pick-up image stored in the RAM 34. The CPU 36 overwrites the title image data stored in the RAM 34 on the pick-up image stored in the DRAM 29 based on the calculated address (Step S34). Further, the CPU 36 reads out the page number data corresponding to the designated pick-up image, which has been stored in the RAM 34 when the pick-up image designated at the step S6 (Step S35). The CPU 36 re-organizes the address table stored in the flash memory 31, so that the greater page number than the page number corresponding to the designated pick-up image is increased by one (Step S36). That is, the next page number data to that of the selected pick-up image data corresponds to no pick-up image data. The CPU 36 provide the superimposed image data with the next page number data to that of the selected pick-up image data. On the other hand, the display unit 12 displays the superimposed image based on the superimposed image data stored in the DRAM 29 with new page number as shown in FIG. 13D (Step S37). The superimposed image data stored in the DRAM 29 is supplied to and stored in the flash memory 31 (Step S38). The CPU 36 stores address data representing the area in which the superimposed image data is stored in the address table linking to the next page number data to that of the designated (original) pick-up image data. Therefore, in the reproducing mode, the superimposed image data can be displayed following the original pick-up image.

The CPU 36 detects whether the mode selecting switch 13 is turned to another position or the trigger switch 15 is depressed to continue the superimposing process (step S39). The display unit 12 continues to display the superimposed image data unless the trigger switch 15 is depressed or the mode selecting switch 13 is turned to another position. When the trigger switch 15 is depressed, the CPU performs the operation of the step S2. When the mode selecting switch 13 is turned to another position, the CPU 36 finishes the title superimposing process.

Figure 14:
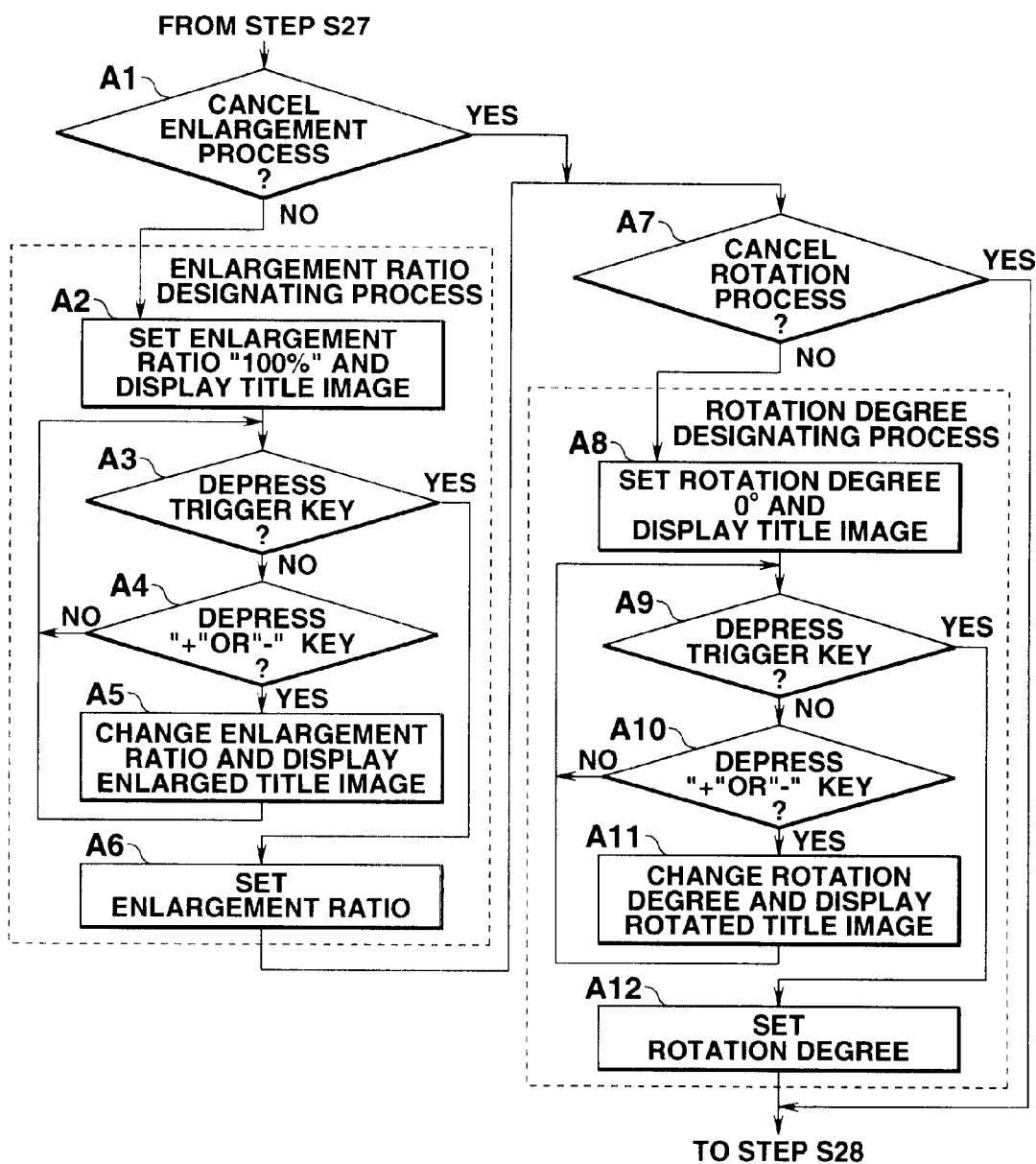
FIG. 14 is a flow chart illustrating an additional superimposing process used in a specific embodiment of the present invention.

In addition, when the superimposing process set forth above is added a process, as shown in FIG. 14 in a specific embodiment, the camera 1 has capabilities to enlarge, reduce and rotate the title image that is superimposed over the pick-up image. This process will be described as follows.

After the title image is designated by the process of the steps S1–S27 in FIGS. 8 and 9, the CPU 36 detects whether the cancel key 16 is depressed to cancel the enlargement process or the trigger switch 15 is depressed to perform the enlargement process (Step A1). When the cancel key 16 is depressed, the CPU 36 performs an operation of step A7.

When the trigger switch 15 is depressed, the CPU 36 sets a default enlargement ratio 100% to the RAM 34 (Step A2). The display unit 12 displays the title image corresponding to the title image data stored in the RAM 34 (Step A2). The CPU 36 detects whether or not the trigger switch 15 is depressed (Step A3) and whether or not the "+" or "−" key 17a or 17b is depressed (Step A4). When the "+" or "−" key 17a or 17b is depressed (Step A4), the CPU 36 increases or decreases the enlargement ratio stored in the RAM 34 by a predetermined value, e.g., 5% (Step A5). Further, the CPU 36 performs an enlargement arithmetic operation on the title image data stored in the RAM 34 based on the enlargement ratio and stores the enlarged (or reduced) title image data in the RAM 34. That is, when the enlargement ratio is greater than 100%, the title image is enlarged. On the other hand, when the enlargement ratio is smaller than 100%, the title image is reduced. The display unit 12 displays the enlarged title image corresponding to the enlarged title image data stored in the RAM 34 (Step A5). When the trigger switch 15 is depressed (Step A3), the CPU 36 stores the enlarged title image data based on the enlargement ratio which is selected at the time of the depression of the trigger switch 15, in a predetermined area of the RAM 34 in the binary image data format (Step A6).

Thereafter, the CPU 36 detects whether the cancel key 16 is depressed to cancel the rotation process or the trigger switch 15 is depressed to perform the rotation process (Step A7). When the cancel key 16 is depressed, the CPU 36 performs the operation of step S28. When the trigger switch 15 is depressed, the CPU 36 sets a default rotation degree 0° to the RAM 34 (Step A8). The display unit 12 displays the title image corresponding to the title image data stored in the RAM 34 (Step A8). The CPU 36 detects whether or not the trigger switch 15 is depressed (Step A9) and whether or not the "+" or "−" key 17a or 17b is depressed (Step A10). When the "+" or "−" key 17a or 17b is depressed (Step A10), the CPU 36 increases or decreases the rotation degree stored in the RAM 34 by a predetermined value, e.g., 5° (Step A11). Further, the CPU 36 performs a rotation arithmetic operation on the title image data stored in the RAM 34 based on the rotation degree and stores the rotated title image data in the RAM 34. The display unit 12 displays the rotated title image corresponding to the rotated title image data stored in the RAM 34 (Step A11). When the trigger switch 15 is depressed (Step A9), the CPU 36 stores the rotated title image data based on the rotation degree which is selected at the time of the depression of the trigger switch 15, in a predetermined area of the RAM 34 in the binary image data format (Step A12), and then performs the operation of the step S28.

Figure 15:
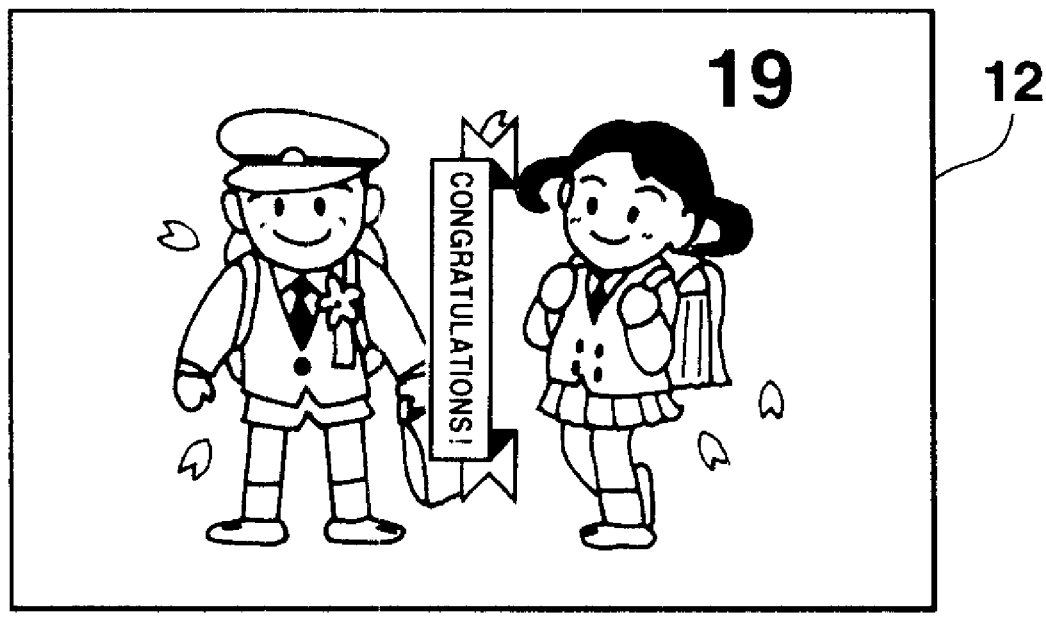
FIG. 15 is a diagram illustrating an image displayed on the display unit in the additional superimposing process used in a specific embodiment of the present invention.

The CPU 36 may further perform a process of changing the title message from a horizontal writing to a vertical writing, as shown in FIG. 15 when the rotation degree is set between 60° and 120° or between 240° and 300° which makes the title message around vertical.

Although the display unit 12 displays the full title image during the precesses of setting various parameter for the title image data in the embodiment set forth above, the display unit 12 may display only a frame representing a position and size of the title image in order to make the display operation quicker.

Although the display unit 12 mounted on the camera 1 is used to display the pick-up image and the title image in the superimpose process, a monitor may be connected to the video terminal 18b of the camera 1, and is used to display the image data and the title image in the superimposing process in order to make the user easer to watch them.

The designated title image data itself may be stored in the flash memory 31 linking to the pick-up image data.

As set forth above, the device and method of the present invention provide the capability of superimposing the title image data including the title massage placed on the plate image, over the pick-up image data. Therefore, the title message data always becomes conspicuous regardless of the color of the pick-up image. Further, the user is able to design various title image out of the various combinations of the title messages and title plates. The user is also able to designate a color of the title message and the plate, a position on which the title image is superimposed, a size of the title image and a rotation of the title image, by watching the title image and the pick-up image on the display unit. Therefore, the user is able to see the actual image which has superimposed the title image over the pick-up image on the display unit 12, while the user designates the above parameters of the title image. Furthermore, since the superimposed image data is prepared with the next page number data to that corresponding to the original pick-up image data, the superimposed image data can be reproduced following the original pick-up image data. Therefore, it becomes easer for the user to compare the superimposed image data with the original pick-up image data.

Although the camera 1 uses the ROM 33 and the flash memory 31 as a memory devices for storing the programs for the superimposing process and the pick-up image data in the embodiment set forth above, a magnetic memory, an optical memory and the like may be used. The memory devices may be detachable from the camera.

The second embodiment will be described referring to FIGS. 16–28.

Figure 16:
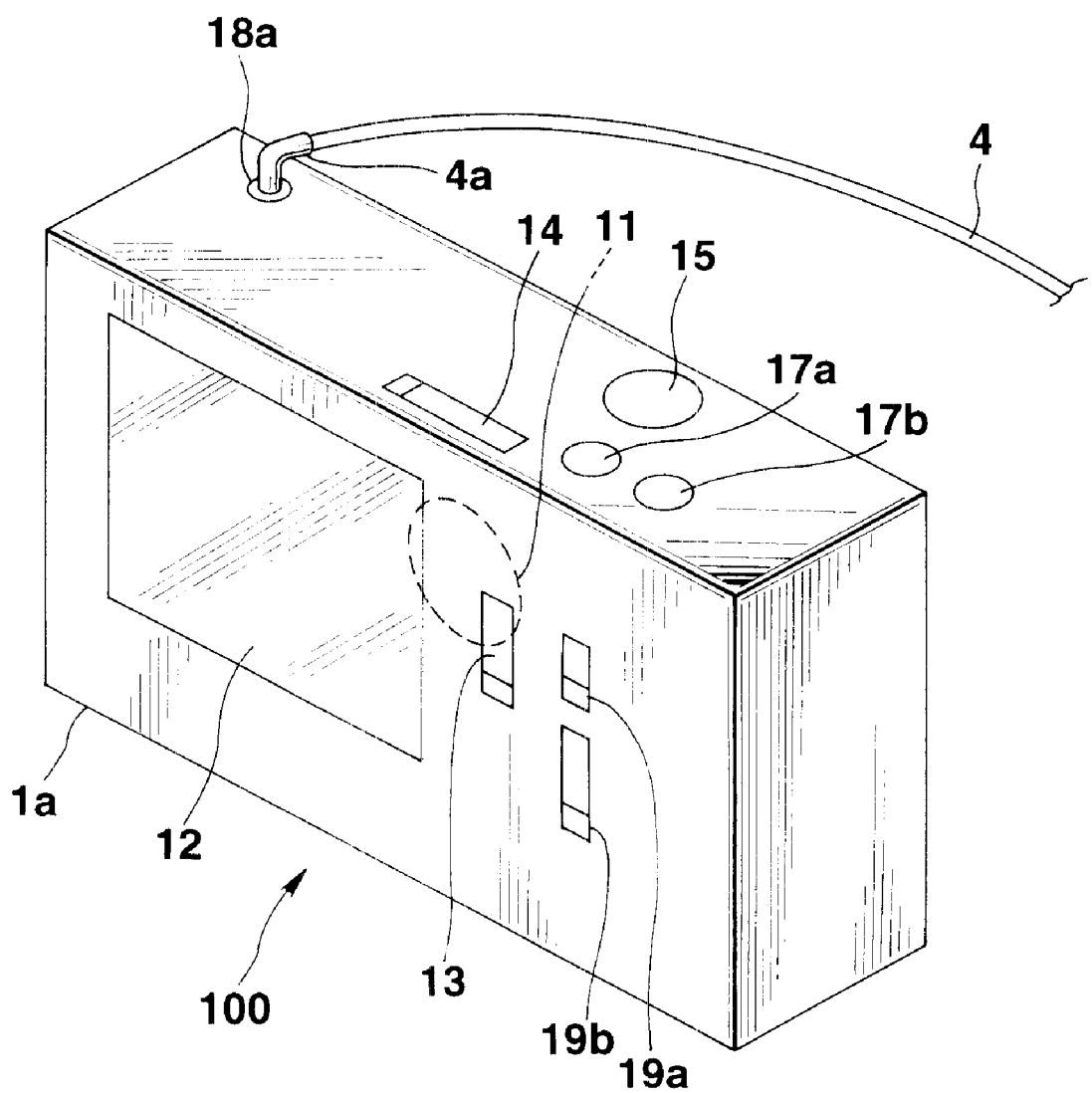
FIG. 16 is a perspective view of a digital camera in a second embodiment of the present invention.

FIG. 16 shows a digital camera 100 capable of using a pick-up image data and an image data received from an external apparatus as a title image. Explanations of the same structures shown in FIG. 16 as those shown in FIG. 1 are omitted. The digital camera 100 has a pick-up mode selecting switch 19a and a communication mode selecting switch 19b. The pick-up mode selecting switch 19a selects one of a image pick-up mode and a title image pick-up mode in the pick-up mode selected by the mode selecting switch 13. In the image pick-up mode selected by the pick-up mode selecting switch 19a, the image signal generated by the CCD 20 is converted to the pick-up image data in the full color image format. The pick-up image data is compressed by the compression/decompression circuit 30 and stored in a flash memory 31A. In the title pick-up mode selected by the pick-up mode selecting switch 19a, the image signals generated by the CCD 20 are converted to the title image data in a binary image data format. The user can designate a desired portion of the title image data. The desired portion of the title image data is compressed by the compression/decompression circuit 30, and then the compressed title image data is stored in a title table located in the flash memory 31A. The communication mode selecting switch 19b selects one of a title image sending mode, a title image receiving mode, a plate image sending mode and a plate image receiving mode in the data communication mode selected by the mode selecting switch 13. In the title image sending mode selected by the communication mode selecting switch 19b, the title image data stored in the title table located in the flash memory 31A is sent to the external apparatus through the I/O terminal 18a. In the title image receiving mode selected by the communication mode selecting switch 19a, a receiving title image data from the external apparatus is compressed by the compression/decompression circuit 30 and stored in the title table located in the flash memory 31A. In the plate image sending mode selected by the communication mode selecting switch 19b, plate image data stored in a plate table located in the flash memory 31A is sent to the external apparatus through the I/O terminal 18a. In the plate image receiving mode selected by the communication mode selecting switch 19b, received plate image data from the external apparatus is compressed by the compression/decompression circuit 30 and stored in the plate table located in the flash memory 31A. The I/O terminal 18a of the digital camera 100 is connected an one-pin plug 4a of a communication cable 4.

Figure 17:
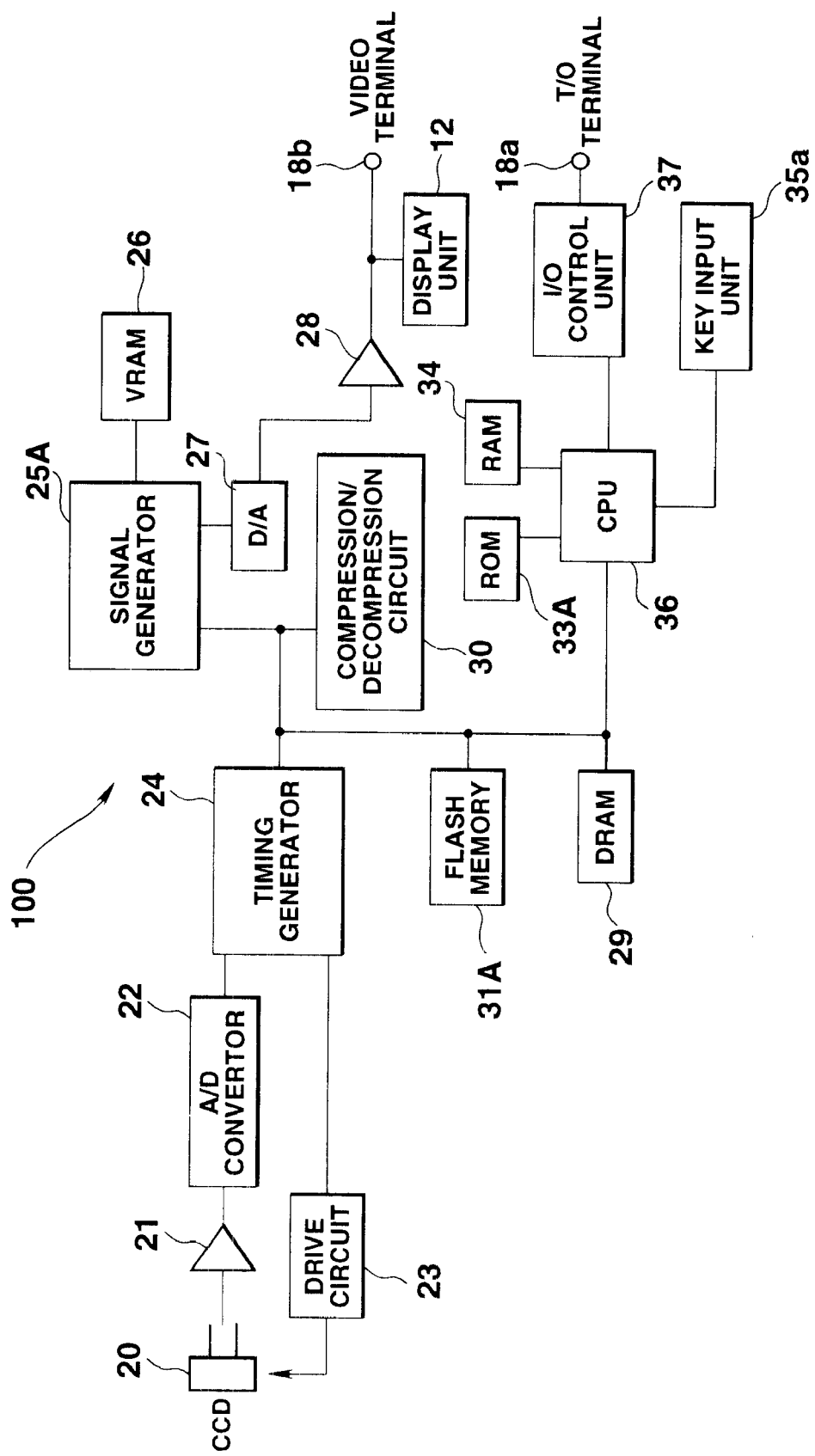
FIG. 17 is a block diagram of the camera shown in FIG. 16.
Figure 18:
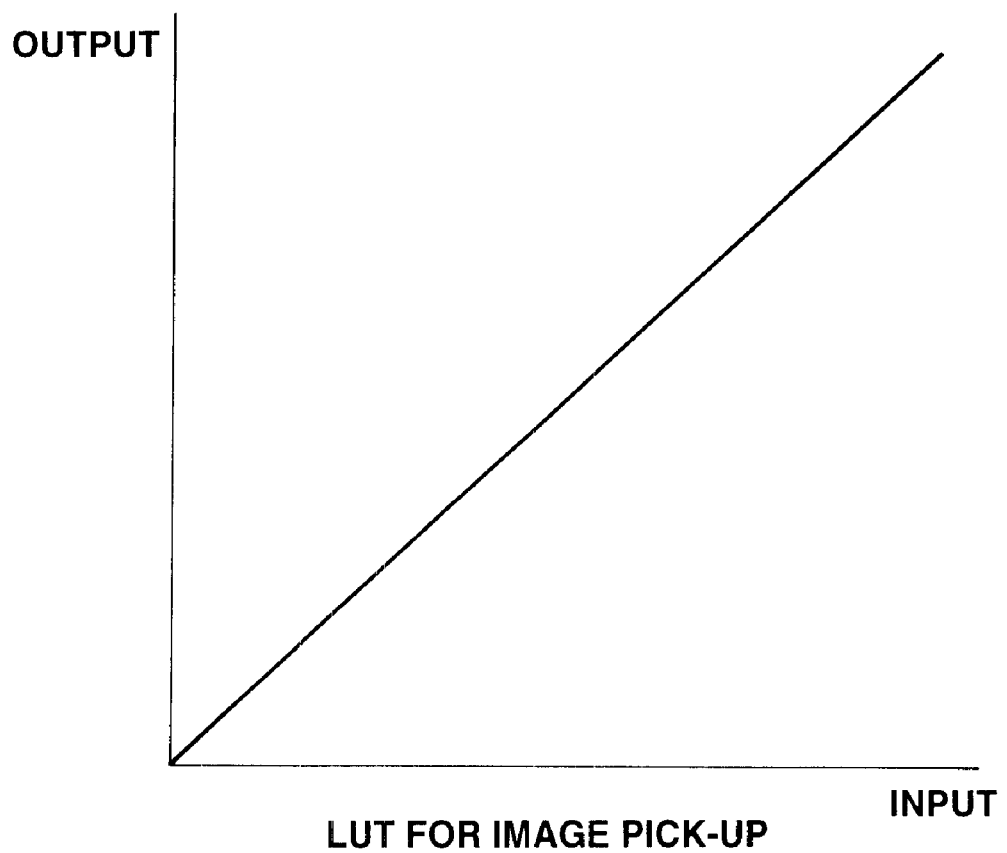
FIG. 18 is a diagram illustrating an image pick-up look up table used in a specific embodiment of the present invention.
Figure 19:
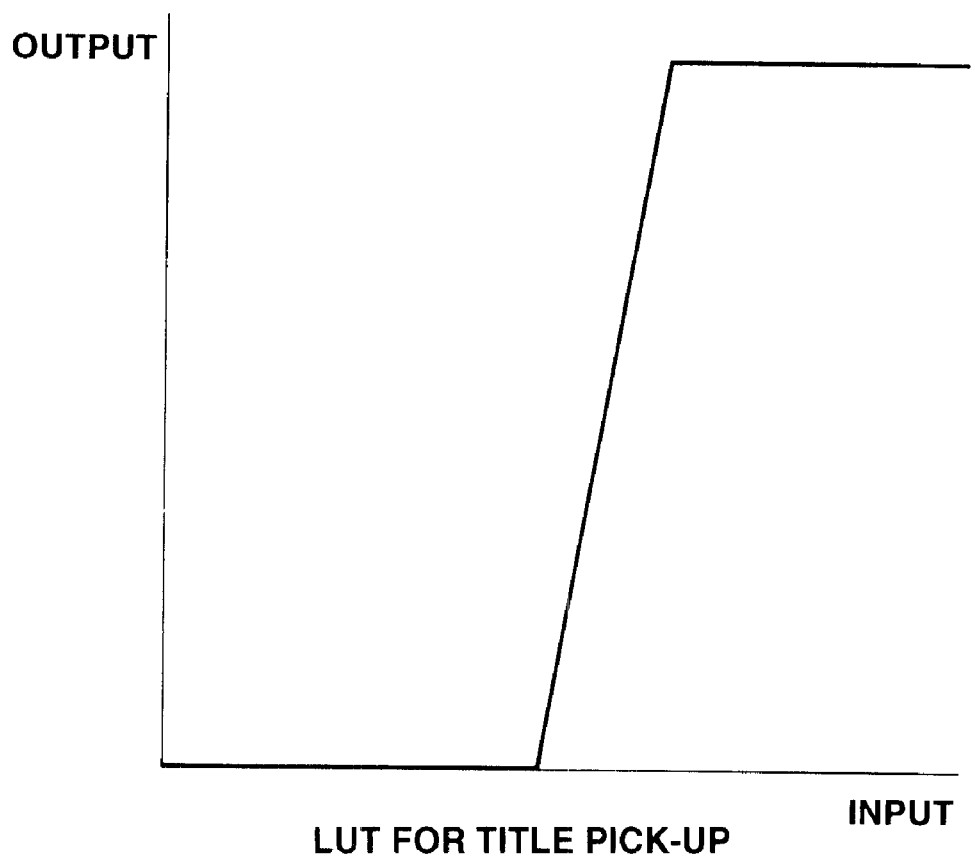
FIG. 19 is a diagram illustrating a title pick-up look up table used in a specific embodiment of the present invention.

FIG. 17 is a block diagram showing the circuit of the digital camera 100. Explanations of the same or similar structures shown in FIG. 17, as those shown in FIG. 2 are also omitted.

A signal generator 25A performs a monochrome arithmetic operation on the digital image signal provided from the A/D convertor 22 and produces a monochrome pick-up image data in the title pick-up mode. The signal generator 25A also performs the same functions described in the first embodiment.

The flash memory 31A stores the pick-up image and the address table in the same manner as the camera 1 of the first embodiment. The flash memory 31A also stores the title table, a title color table, the plate table, and a plate color table. The title table contains the title image data in compressed binary image data format which can be decompressed by the compression/decompression circuit 30. The title image data contained in the title table are prepared in advance, generated by the CCD 20 and received from the external apparatus. The title color table contains color codes to be applied to the title image data. The plate table contains plate image data in the compressed binary image data format which can be decompressed by the compression/decompression circuit 30. The plate image data contained in the plate table are prepared in advance and received from the external apparatus. The plate color table which contains color codes to be applied to the plate image data.

An ROM 33A stores the image pick-up process program, a title image pick-up process program, the title image superimposing process program, and the data communication process program, all of which are performed by a CPU 36. The ROM 33A also stores an image pick-up Look Up Table (LUT) shown in FIG. 18 and a title pick-up LUT shown in FIG. 19. The image pick-up LUT is a γ correction table for correcting a luminosity element of an image data. In the image pick-up mode, the image pick-up LUT is used to correct the luminosity element of the pick-up image data corresponding to the image signal generated by the CCD 20. The title pick-up LUT is also a γ correction table for correcting a luminosity element of an image data. The title pick-up LUT converts a inputting image data into an outputting image data having only a black and white levels. In the title pick-up mode, the title pick-up LUT is use to correct the luminosity element of the monochrome image data generated by the signal generator 25A and produce the title image data having only the black and white levels. The ROM 33A also stores a threshold value data for converting the title image data having the black and white level into the binary image format.

The operation of the digital camera 100 set forth above will be described as follows.

Figure 20:
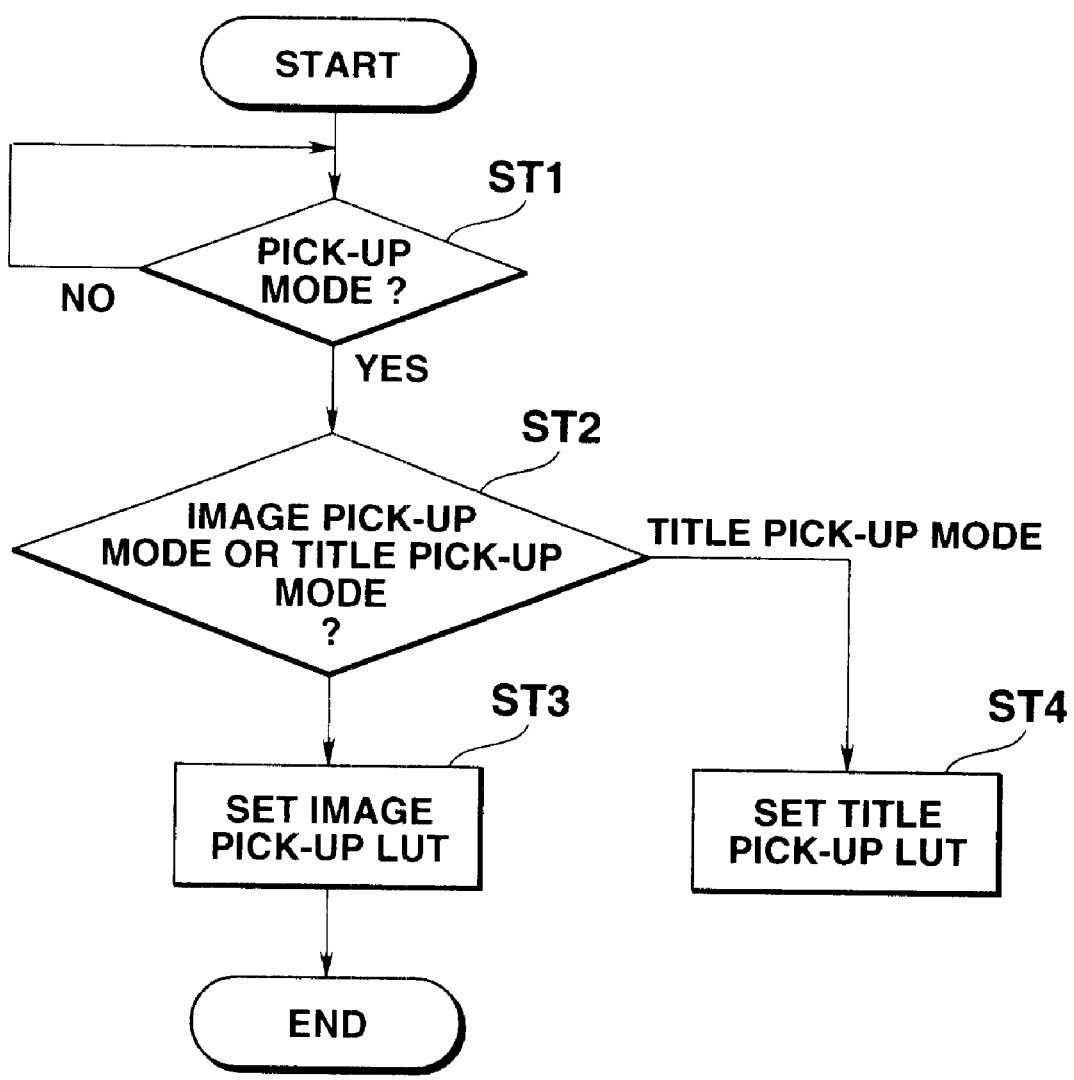
FIG. 20 is a flow chart illustrating an image pick-up mode process used in a specific embodiment of the present invention.

As shown in FIG. 20, in the pick-up mode selected by the mode selecting switch 13 (Step ST1), the CPU 36 detects whether the image pick-up mode or the title image pick-up mode is selected by the pick-up mode selecting switch 13a (Step ST2). When the image pick-up mode is selected, the CPU 36 duplicates the image pick-up LUT from the ROM 33A to the RAM 34 (Step ST3). When the title pick-up mode is selected, the CPU 36 duplicates the title pick-up image LUT from the ROM 33A to the RAM 34 (Step ST4).

In the image pick-up mode, the CPU 36 performs an operation of picking up an image and storing the pick-up image in the flash memory 31 on response to the depression of the trigger switch 15. Under the control of the CPU 36, the image signals generated by the CCD 20 are supplied to the A/D convertor 22 through the buffer 21 and are converted into the digital image signal by the A/D convertor 22. The digital image signal is supplied from the A/D convertor 22 to the signal generator 25A through the timing generator 24. The signal generator 25A performs the chromatical arithmetic process on the digital image signal and produces the pick-up image data including the luminosity data and the chromatical data. The pick-up image data is temporally stored in the DRAM 29. The CPU 36 performs the γ correction process on the pick-up image stored in the DRAM 29 based on the image pick-up LUT. That is, the CPU 36 reads out the luminosity data of the pick-up image data from the DRAM 29 and converts the luminosity data to the corrected luminosity data referring to the image pick-up LUT. The pick-up image data on which the CPU 36 has performed the γ correction process is transferred from the DRAM 29 to the compression/decompression circuit 30 and compressed by the compression/decompression circuit 30. The compressed pick-up image data is stored in the flash memory 31 under the address control of the CPU 36. The CPU 36 provides for the pick-up image data stored in the flash memory 31 with a page number data and writes the page number data in the address table stored in the flash memory 31. The page number is provided for the pick-up image data in chronological order. The address table is also stored the address data representing the area of the flash memory 31 in which the pick-up image data is stored.

Figure 21:
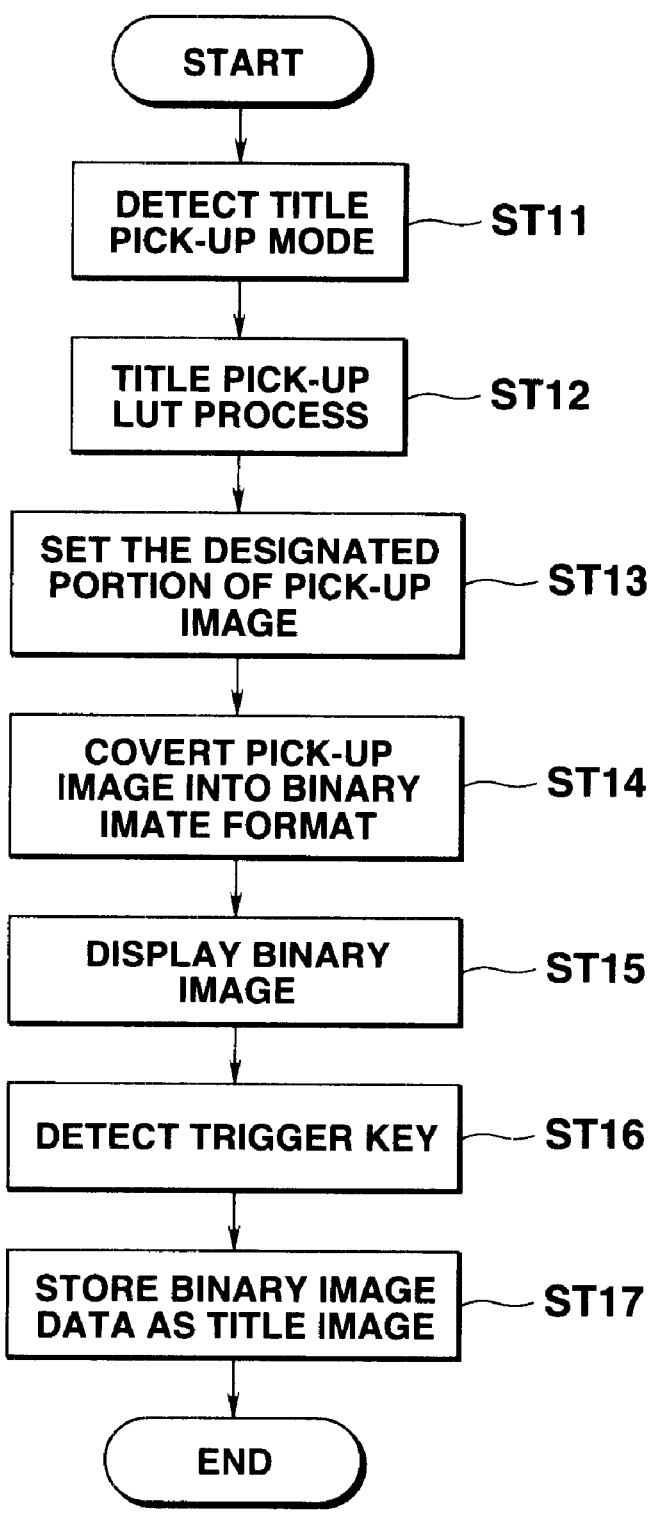
FIG. 21 is a flow chart illustrating a title pick-up process used in a specific embodiment of the present invention.
Figure 22:
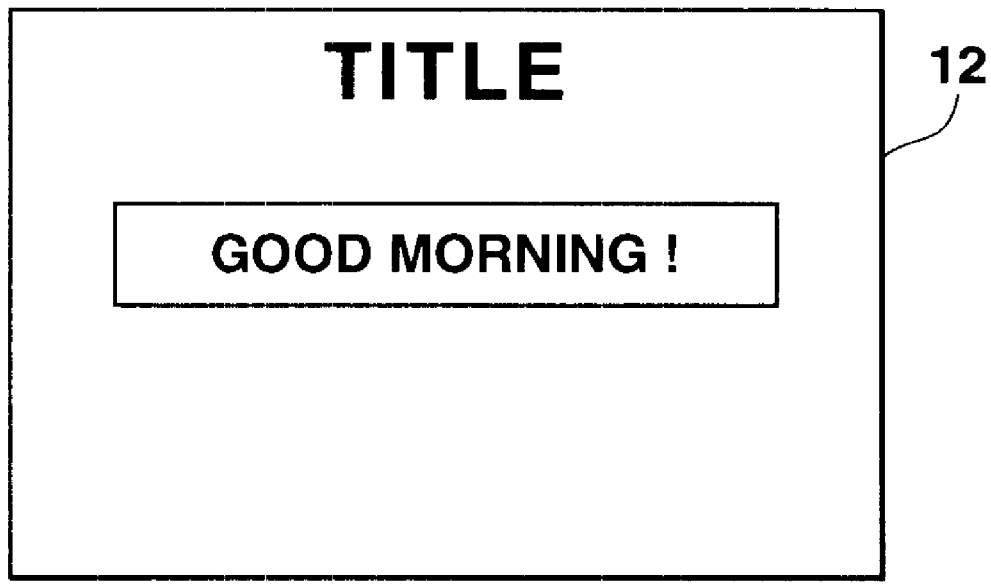
FIG. 22 is a diagram illustrating an image displayed on the display unit in a title pick-up process used in a specific embodiment of the present invention.

FIG. 21 shows the operation of the camera 100 in the title pick-up mode. In the title pick-up mode selected by the pick-up mode selecting switch 19a (Step ST11), the CPU 36 performs an operation of picking up an image and storing the pick-up image as the title image data in the title table located in the flash memory 31 in response to the depression of the trigger switch 15. Under the control of the CPU 20, the image signals generated by the CCD 20 are converted into a digital image signal by the A/D convertor 22 in the same manner with that in the image pick-up mode. The digital image signal is supplied from the A/D convertor 22 to the signal generator 25A through the timing generator 24. The signal generator 25A converts the digital image signal to monochrome pick-up image data. The monochrome pick-up image data is temporally stored in the DRAM 29. The CPU 36 performs the γ correction process on the monochrome pick-up image data stored in the DRAM 29 based on the title pick-up LUT. That is, the CPU 36 converts the monochrome pick-up image data to the black and white image data which has only black level data and white level data, referring to the title pick-up LUT (Step ST12). The display unit 12 displays the black and white image corresponding to the black and white image data stored in the DRAM 29. The CPU 36 allows for the user to designate a desired portion of the black and white image on the display unit 12 using the "+" and "−" keys 17a and 17b for designating the desired portion and the trigger switch 15 for determining the designated portion (Step ST13). That is, the user designates a lowest position of the desired portion of the black and white image on the display unit 12 using the "+" and "−" keys 17a and 17b for changing the lowest position of the desired portion and the trigger switch 15 for determining the designated lowest position. Further, the user designates a highest position of the desired portion in the same manner. Thus, the user designates the height of the desired portion of the black and white image. Thereafter, the user designates a left position of the desired portion using the "+" and "−" keys 17a and 17b for changing the left position of the desired portion and the trigger switch 15 for determining the designated leftmost position. Further, the user designates a right position of the desired portion in the same manner. Thus, the user designates the width of the desired portion of the black and white image. FIG. 22 shows that the user designated the desired portion "GOOD MORNING" form the black and white image. After the desired portion of the black and white image is designated, the CPU 36 reads out from the DRAM 29 the black and white image data corresponding to the desired portion designated by the user, and converts the black and white image data into the binary image data based on the threshold value data stored in the ROM 33A (Step ST14). The display unit 12 displays the binary image corresponding to the binary image data stored in the DRAM 29 (Step ST15). The CPU 36 detects whether or not the trigger switch 15 is depressed to permit to store the binary image data displayed on the display unit 12 as the title image in the title table (Step ST16). When the trigger switch 15 is depressed, the binary image data is transferred from the DRAM 29 to the compression/decompression circuit 30 and compressed by the compression/decompression circuit 30. The compressed binary image data is stored in title table located in the flash memory 31 as the title image data (Step ST17). In this process, the title pick-up LUT may be changed by the user in order to change the relation between the input level and the output level. Further, the title pick-up LUT may be set the relation between the input level and the output level so that the corrected image data still has gray level. In this case, the threshold value may be changed by the user.

Thus, the user can be used an image picked up by the camera 1 as a title image other than the pre-stored title image.

Figure 23:
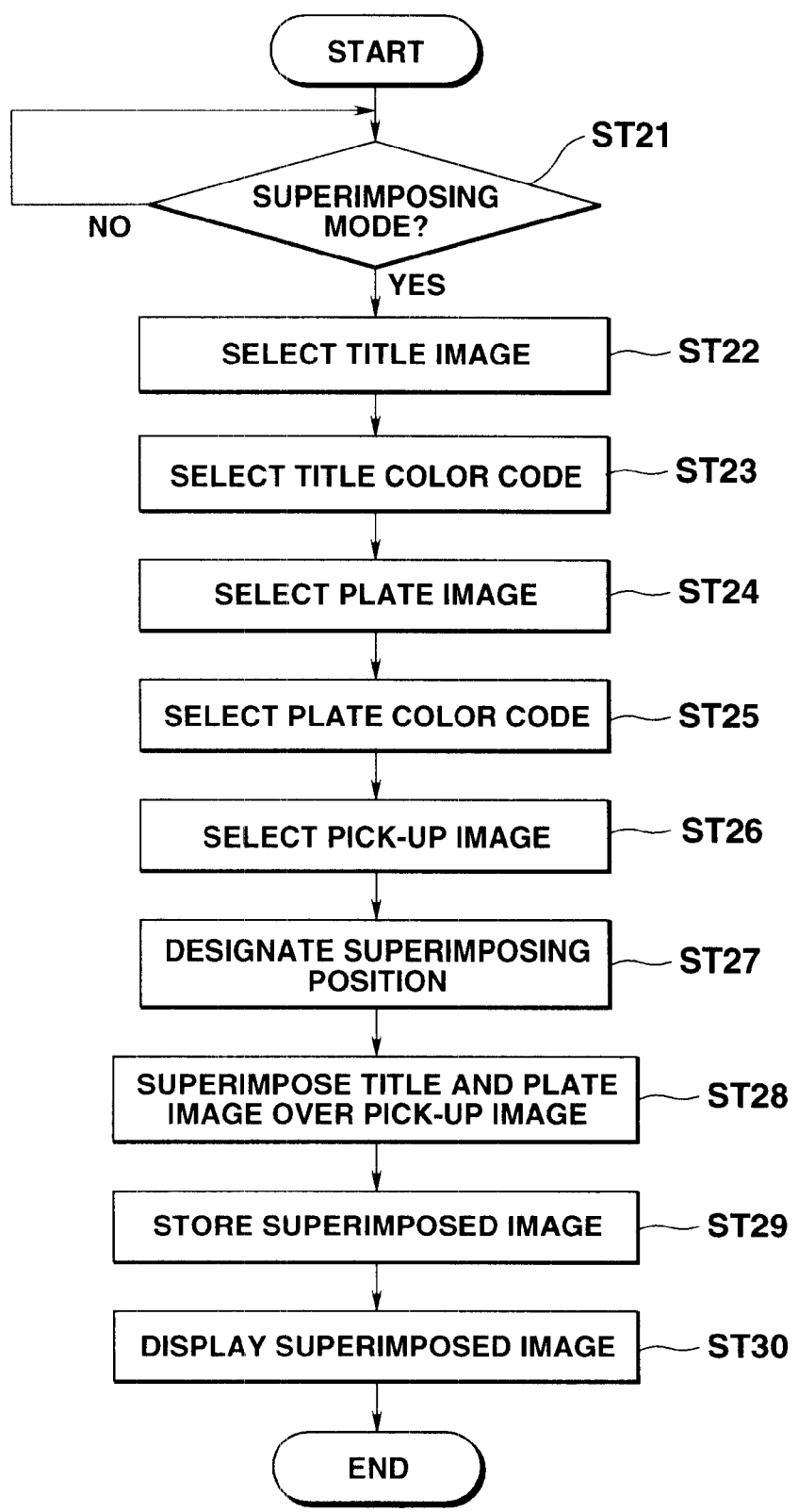
FIG. 23 is a flow chart illustrating a superimposing process used in a specific embodiment of the present invention.

The superimposing operation of the camera 100 will be described referring to FIG. 23. The camera 100 performs the similar operation to that of the camera 1 in the first embodiment.

In the title plate combination mode (Step ST21), the CPU 36A reads out the title data contained in the title table stored in the flash memory 31A and displays it on the display unit 12. The user selects the desired title image from the title table stored in the flash memory 31A using the "+" and "−" keys 17a and 17b and the trigger switch 15 in the similar manner to that of the steps S9–S12 in FIG. 8 (Step ST22). After the title data is selected, the CPU 36 reads out the title color code contained the title color table stored in the flash memory 31A and displays the designated title image in the color corresponding to the color code on the display unit 12 in the similar manner to that of the step S13 in FIG. 8. The user selects the desired title color from the title color table stored in the flash memory 31A using the "+" and "−" keys 17a and 17b and the trigger switch 15 in the similar manner to that of the steps S14–S17 in FIG. 8 (Step ST23). After the title color code is selected, the CPU 36 reads out the plate image data contained the plate data table stored in the flash memory 31A and displays the plate image on which the title image is overwritten on the display unit 12 in the similar manner to that of the step S18 in FIG. 8. The user selects the desired plate image from the plate table stored in the flash memory 31A using the "+" and "−" keys 17a and 17b and the trigger switch 15 in the similar manner to that of the steps S19–S22 in FIG. 8 (Step ST24). After the plate data is selected, the CPU 36 reads out the plate color code contained the title color data table stored in the flash memory 31A and displays the selected plate image in color corresponding to the color code on the display unit 12 in the similar manner to that of the step S23 in FIG. 9 (step ST25). The user selects the desired plate color from the title table stored in the flash memory 31A using the "+" and "−" keys 17a and 17b and the trigger switch 15 in the similar manner to that of the steps S24–S27 in FIG. 9 (Step ST25). Thereafter, the CPU 36 perfumes the similar manner to that of the step S28 in FIG. 9 in order to produce title-plate image data in the full color image format.

Thereafter, the CPU 36 reads out the pick-up image data stored in the flash memory 31A and displays it on the display unit 12 in the similar manner to that of the step S2 in FIG. 8. The user selects the desired pick-up image stored in the flash memory 31A using the "+" and "−" keys 17a and 17b and the trigger switch 15 in the similar manner to that of the steps S3–S6 in FIG. 8 (Step ST26). After the pick-up image data is selected, the CPU 36 performs the similar operation to that of the steps S29–S33 in FIG. 9 (Step ST27) in order to determine the position in which the title-plate image is superimposed over the pick-up image. Further, the CPU 26 performs the similar operation to that of the steps S34–S39 in FIG. 9 in order to superimpose the title-plate image data over the pick-up image data and store the superimposed image data in the flash memory 31A (Steps ST28–ST30).

Figure 24B:
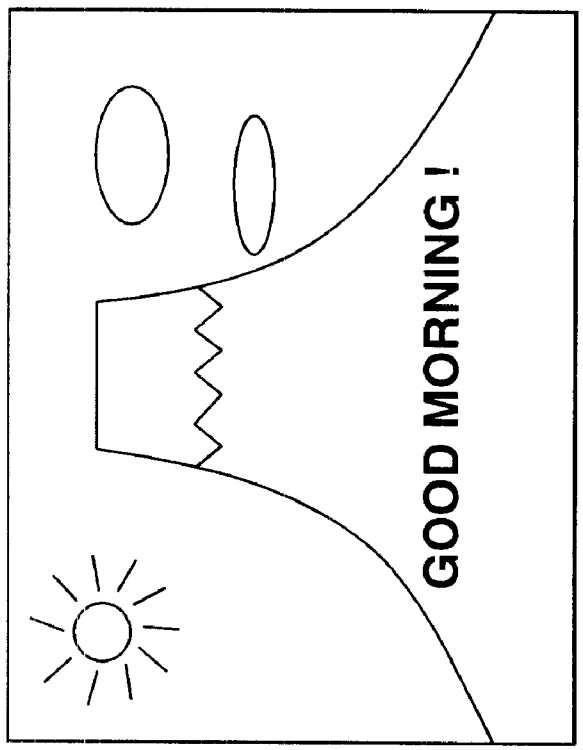
FIGS. 24A and 24B are diagrams illustrating an image displayed on the display unit in the superimposing process used in a specific embodiment of the present invention.
Figure 24A:
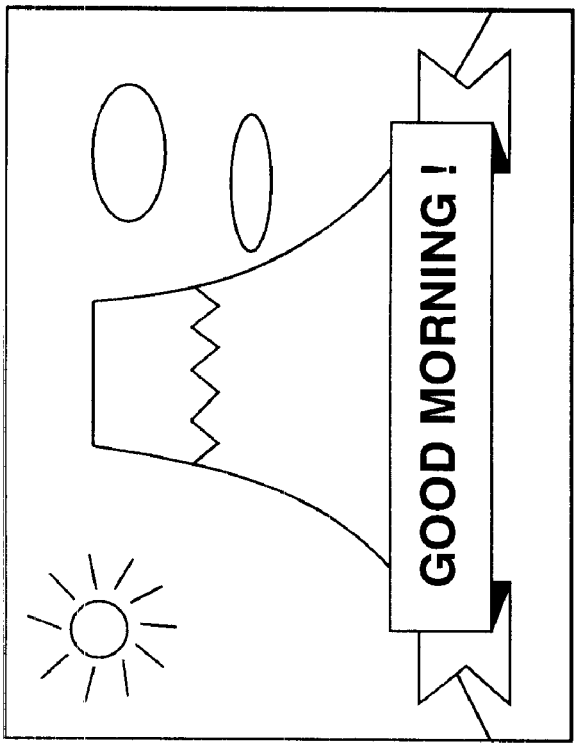

FIGS. 24A and 24B shows the superimposed images displayed on the display unit 12. In FIG. 24A, the display unit 12 displays the superimposed image which is superimposed the title-plate image over the pick-up image. In FIG. 24B, the display unit 12 displays the superimposed image which is superimposed only the title image over the pick-up image. In this case, the plate designating process and the plate color designating process is canceled by the depression of the cancel key 16.

Figure 25:
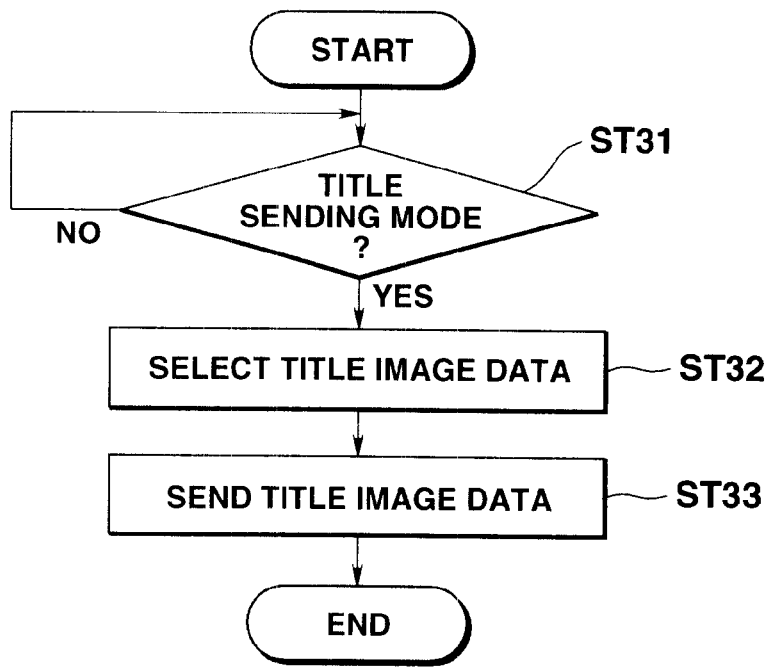
FIG. 25 is a flow chart illustrating a title data sending process used in a specific embodiment of the present invention.

As shown in FIG. 25, when the title sending mode is selected by the communication mode selecting switch 19b in the data communication mode (Step ST31), the CPU 36 performs the title sending operation. First, the CPU 36 reads out the title image data contained in the title table stored in the flash memory 31A and displays it on the display unit 12. The user selects the desired title image from the title table stored in the flash memory 31A using the "+" and "−" keys 17a and 17b and the trigger switch 15 (Step ST32). Thereafter, the CPU 36 provides the selected title image data to the I/O control unit 37. The I/O control unit 37 converts the title image data into a serial transfer data format and send it to the external apparatus through the I/O terminal 18a (Step S33).

Figure 26:
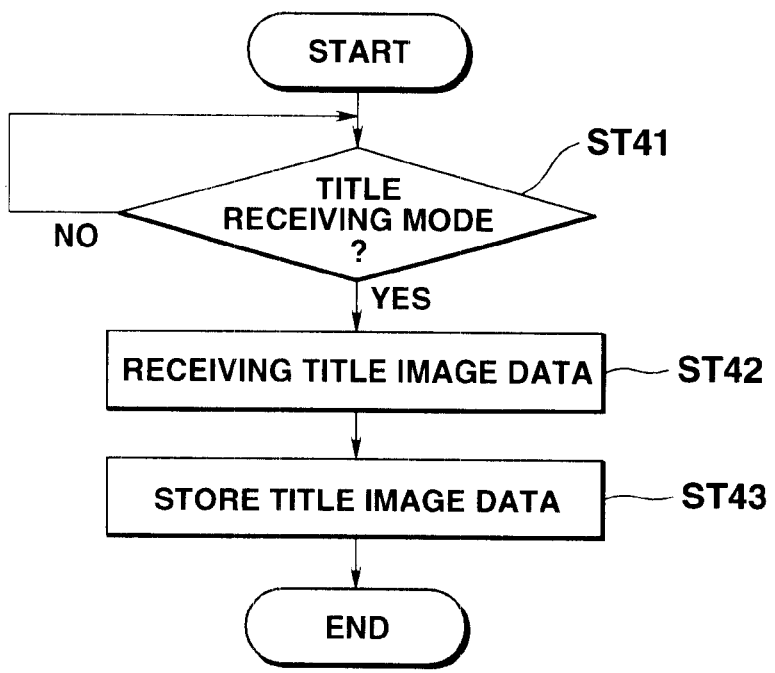
FIG. 26 is a flow chart illustrating a title data receiving process used in a specific embodiment of the present invention.

As shown in FIG. 26, when the title receiving mode is selected by the communication mode selecting switch 19b in the data communication mode (Step ST41), the I/O control unit 37 is in state of waiting for receiving data. When image data in the serial transfer data format is received by the I/O control unit 37 from the external apparatus through the I/O terminal 18a, the I/O control unit 37 converts the receiving image data into the parallel image data and provides the receiving image data to the CPU 36 (Step ST42). The CPU 36 detects a format of the receiving image data. When the receiving image data is in the binary image data format, the CPU 36 provide the receiving image data to the compression/decompression circuit 30 and stores the compressed image data in the title table located in the flash memory 31A (Step ST43). When the receiving image data is in the full color image format, the CPU 36 converts the format of the receiving image data into the binary image data format. Further, the CPU 36 provides the receiving image data in the binary image data format to the compression/decompression circuit 30 and stored the compression image data in the title table located in the flash memory 31A (Step ST43).

Figure 27:
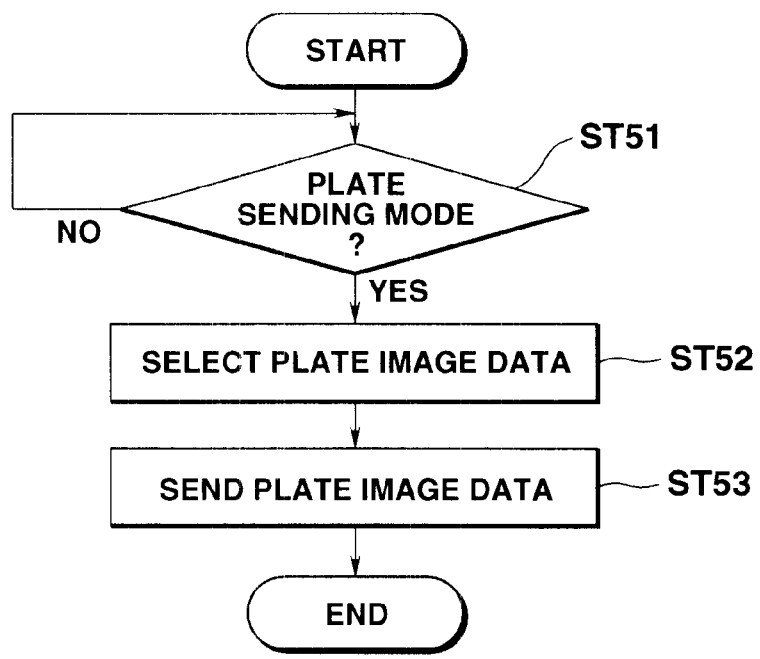
FIG. 27 is a flow chart illustrating a plate data sending process used in a specific embodiment of the present invention.

As shown in FIG. 27, when the plate sending mode is selected by the communication mode selecting switch 19b in the data communication mode (Step ST51), the CPU 36 performs the title sending operation. First, the CPU 36 reads out the plate image data contained in the plate table stored in the flash memory 31A and displays it on the display unit 12. The user selects the desired plate image from the plate table stored in the flash memory 31A using the "+" and "−" keys 17a and 17b and the trigger switch 15 (Step ST52). Thereafter, the CPU 36 provides the selected plate image data to the I/O control unit 37. The I/O control unit 37 converts the plate image data into a serial transfer data format and send it to the external apparatus through the I/O terminal 18a (Step S53).

Figure 28:
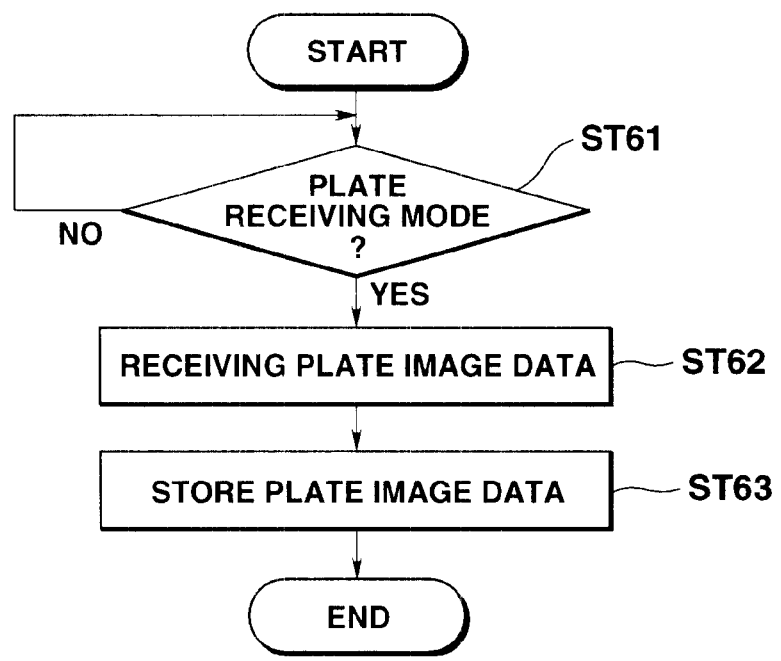
FIG. 28 is a flow chart illustrating a plate data receiving process used in a specific embodiment of the present invention.

As shown in FIG. 28, when the plate receiving mode is selected by the communication mode selecting switch 19b in the data communication mode (Step ST61), the I/O control unit 37 is in state of waiting for receiving data. When image data in the serial transfer data format is received by the I/O control unit 37 from the external apparatus through the I/O terminal 18a, the I/O control unit 37 converts the receiving image data into the parallel image data and provides the receiving image data to the CPU 36 (Step ST62). The CPU 36 detects a format of the receiving image data. When the receiving image data is in the binary image data format, the CPU 36 provide the receiving image data to the compression/decompression circuit 30 and stores the compressed image data in the title table located in the flash memory 31A (Step ST63). When the receiving image data is in the full color image data format, the CPU 36 converts the format of the receiving image data into the binary image data format. Further, the CPU 36 provides the receiving image data in the binary image data format to the compression/decompression circuit 30 and stored the compression image data in the plate table located in the flash memory 31A (Step ST63).

Thus, the title image data and the plate image data can be received from the external apparatus, such as a personal computer. Further, the title image data and the plate image data can be sent to the external apparatus. Therefore, the user can use a graphic function provided for the external apparatus to prepare the title image data and the plate image data.

Although the camera 100 uses the ROM 33 and the flash memory 31A as a memory devices for storing the programs for the superimposing process and the pick-up image data in the embodiment set forth above, a magnetic memory, an optical memory and the like may be used. The memory devices may be detachable to the camera.

The present invention may be used in a video camera. Further, the present invention may be used in the personal computer which has an image pick-up function by a PC camera card pursuant to the PCMCIA (Personal Computer Memory Card International Association) standard.

Although the present invention has been described with reference to certain preferred embodiments, it should be understood that it is not intended to be limited to these embodiments. Rather, it is intended to includes many alternative and modifications, which would be apparent to a person of ordinary skill in the art and which fall within the teachings of the present invention, and its scope which is defined by the following claims.

What is claimed is:

1. An image data processing apparatus permitting a user to view stored images in a particular sequence, the apparatus comprising:

image pick-up means for picking up an optical image and producing pick-up image data corresponding to the optical image;

pick-up data storing means for storing a plurality of the pick-up image data produced by the image pick-up means, the pick-up data storing means including an address table for storing data representing the sequence in which pick-up image data stored in the pick-up data storing means is accessed;

pick-up data selecting means for selecting one of the pick-up image data stored in the pick-up data storing means;

image data modifying means for modifying the selected pick-up image data selected by the pick-up data selecting means;

writing means for writing the modified pick-up image data in the pick-up data storing means; and reorganizing means for reorganizing the data stored in the address table, which represents the sequence in which pick-up image data stored in the pick-up data storing means is accessed, so that the modified pick-up image data can be accessed in sequence following the selected pick-up image data.

2. An image data processing apparatus as set forth in claim 1, wherein the address table stores page number data determining the sequence in which pick-up image data stored in the pick-up data storing means is accessed, and the reorganizing means reorganizes the page number data stored in the address table and provides the modified pick-up image data with page number data next in sequence to that of the selected pick-up image data.

3. An image data processing apparatus as set forth in claim 2, further comprising:

access means for accessing the pick-up image data stored in the pick-up data storing means in the sequence determined by the page number data stored in the address table.

4. An image data processing apparatus as set forth in claim 3, further comprising:

display means for displaying image corresponding to the pick-up image data accessed by the access means.

5. An image data processing apparatus as set forth in claim 1, wherein the image data modifying means includes image data storing means for storing a plurality of image data, image data selecting means for selecting the image data stored in the image data storing means, and superimposing means for superimposing the selected image data selected by the image data selecting means over the selected pick-up image data selected by the pick-up data selecting means.

6. A method for processing image data with an apparatus having a memory and permitting a user to view stored images in a particular sequence, the method comprising:

an image pick-up step of picking up an optical image and producing pick-up image data corresponding to the optical image;

a pick-up data storing step of storing the pick-up image data produced by the image pick-up step in the memory;

a pick-up data selecting step of selecting one of the pick-up image data stored in the memory by the pick-up data storing step;

an image data modifying step of modifying the selected pick-up image data selected by the pick-up data selecting step;

a writing step of writing the modified pick-up image data in the memory; and a linking step of reorganizing data representing the sequence in which pick-up image data stored in the memory is accessed, so that the modified pick-up image data can be accessed in sequence following the selected pick-up image data.

7. A method for processing image data with an apparatus having a memory and permitting a user to view stored images in a particular sequence, the method comprising:

an image pick-up step of picking up an optical image and producing pick-up image data corresponding to the optical image;

a pick-up data storing step of storing the pick-up image data produced by the image pick-up step in the memory;

a pick-up data selecting step of selecting one of the pick-up image data stored in the memory by the pick-up data storing step;

an image data modifying step of modifying the selected pick-up image data selected by the pick-up data selecting step;

a writing step of writing the modified pick-up image data in the memory; and a reorganizing step of reorganizing page number data determining the sequence in which pick-up image data stored in the memory is accessed and providing the modified pick-up image data with page number data next in sequence to that of the selected pick-up image data, so that the modified pick-up image data can be accessed in sequence following the selected pick-up image data.

8. A method for processing image data as set forth in claim 7, the method further comprising:

an accessing step of accessing the pick-up image data stored in the memory in the sequence determined by the page number data reorganized by the reorganizing step.

* * * * *